US012733561B2

(12) United States Patent
Tamai et al.

(10) Patent No.: US 12,733,561 B2
(45) Date of Patent: Sep. 15, 2026

(54) WORK VEHICLE AND METHOD FOR CONTROLLING WORK VEHICLE

(71) Applicant: Kubota Corporation, Osaka (JP)

(72) Inventors: Takuya Tamai, Sakai (JP); Tomohiro Kinoshita, Sakai (JP); Koichi Kuroda, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 13 days.

(21) Appl. No.: 18/976,400

(22) Filed: Dec. 11, 2024

(65) Prior Publication Data

US 2025/0098563 A1 Mar. 27, 2025

Related U.S. Application Data

(63) Continuation of application No. PCT/JP2023/021173, filed on Jun. 7, 2023.

(30) Foreign Application Priority Data

Jun. 17, 2022 (JP) ................................ 2022-097793

(51) Int. Cl.
*A01B 69/04* (2006.01)

(52) U.S. Cl.
CPC ................................. *A01B 69/008* (2013.01)

(58) Field of Classification Search
CPC ..... A01B 69/00; A01B 69/001; A01B 69/008; G01S 17/86; G05D 1/242; G05D 1/646; G05D 2107/21; G05D 2109/10
See application file for complete search history.

(56) References Cited

U.S. PATENT DOCUMENTS

2023/0284550 A1 9/2023 Yuasa et al.
2023/0288936 A1 9/2023 Yuasa et al.
2023/0288942 A1 9/2023 Yuasa et al.

FOREIGN PATENT DOCUMENTS

EP 3766320 A1 1/2021
JP 2019154379 A 9/2019

(Continued)

OTHER PUBLICATIONS

Bergman M., et al., Robot Farmers. Autonomous Orchard Vehicles Help Tree Fruit Production. IEEE Robotics & Automation Magazine, Mar. 2015 (Year: 2015).*

(Continued)

*Primary Examiner* — Charles J Han
(74) *Attorney, Agent, or Firm* — Keating & Bennett, LLP

(57) ABSTRACT

A work vehicle includes an exterior sensor to output sensor data indicating a distribution of geographic features around the work vehicle, and a controller configured or programmed to control self-traveling of the work vehicle, detect two crop rows existing on opposite sides of the work vehicle based on the sensor data, and cause the work vehicle to travel along a path between the two crop rows. During travel, if an end of at least a crop row that corresponds to a turning direction between the two crop rows is detected based on the sensor data, the controller is configured or programmed to set a coordinate system for turning travel that is fixed to a ground surface and a target point for the turning travel. The controller is configured or programmed to control the turning travel toward the target point based on the coordinate system.

14 Claims, 25 Drawing Sheets

(56) References Cited

FOREIGN PATENT DOCUMENTS

| | | |
|---|---|---|
| WO | 2022107586 A1 | 5/2022 |
| WO | 2022107587 A1 | 5/2022 |
| WO | 2022107588 A1 | 5/2022 |

OTHER PUBLICATIONS

International Search Report in PCT/JP2023/021173, mailed Jul. 11, 2023, 2 pages.

Ishiyama et al., "Multi-purpose Autonomous Orchard Vehicles, Tree-shaping for Labor Saving, and Vehicle Management IoT System", Yamaha Motor Technical Review, No. 56, Dec. 2021, 11 pages.

* cited by examiner

WORK VEHICLE AND METHOD FOR CONTROLLING WORK VEHICLE

CROSS REFERENCE TO RELATED APPLICATIONS

This application claims the benefit of priority to Japanese Patent Application No. 2022-097793 filed on Jun. 17, 2022 and is a Continuation Application of PCT Application No. PCT/JP2023/021173 filed on Jun. 7, 2023. The entire contents of each application are hereby incorporated herein by reference.

BACKGROUND OF THE INVENTION

1. Field of the Invention

The present disclosure relates to work vehicles, and control methods for work vehicles.

2. Description of the Related Art

As attempts in next-generation agriculture, research and development of smart agriculture utilizing ICT (Information and Communication Technology) and IoT (Internet of Things) are under way. Research and development are also directed to the automation and unmanned use of tractors or other work vehicles to be used in the field. For example, work vehicles which travel via automatic steering by utilizing a positioning system that is capable of precise positioning, e.g., a GNSS (Global Navigation Satellite System), are coming into practical use.

On the other hand, development of movable units which autonomously move by utilizing distance sensors, e.g., LiDAR (Light Detection and Ranging) is also under way. For example, Japanese Laid-Open Patent Publication No. 2019-154379 discloses an example of a work vehicle which performs self-traveling in between crop rows in a field by utilizing LiDAR.

SUMMARY OF THE INVENTION

In an environment in which trees or crops are distributed with a high density, e.g., vineyards or other orchards or forests, leaves thriving in upper portions of the trees create canopies, each of which serves as an obstacle or a multiple reflector against radio waves from a satellite. Such an environment hinders accurate positioning using a GNSS. In an environment where GNSS cannot be used, use of SLAM (Simultaneous Localization and Mapping), where localization and map generation simultaneously take place, might be possible. However, various challenges exist in the practical application of a work vehicle that uses SLAM to travel automatically in an environment with a multitude of trees. One challenge is that the distribution of tree leaves changes significantly with seasonal changes, making it impossible to continue using maps that were created in the past, for example. A work vehicle according to an illustrative example embodiment of the present disclosure performs self-traveling among a plurality of crop rows. The work vehicle includes an exterior sensor to output sensor data indicating a distribution of geographic features around the work vehicle, and a controller configured or programmed to control self-traveling of the work vehicle. The controller is configured or programmed to detect two crop rows existing on opposite sides of the work vehicle based on the sensor data, and cause the work vehicle to travel along a path between the two crop rows. During travel, if an end of at least a crop row that corresponds to a turning direction between the two crop rows is detected based on the sensor data, the controller is configured or programmed to set a coordinate system for turning travel that is fixed to a ground surface and a target point for the turning travel. The controller is configured or programmed to control the turning travel toward the target point based on the coordinate system.

Example embodiments of the present disclosure may be implemented using devices, systems, methods, integrated circuits, computer programs, computer-readable storage media, or any combination thereof. The computer-readable storage media may be inclusive of volatile storage media, or non-volatile storage media. The devices each may include a plurality of devices. In the case where the devices each include two or more devices, the two or more devices may be included within a single apparatus, or divided over two or more separate apparatuses.

According to example embodiments of the present disclosure, it is possible to realize work vehicles that each smoothly perform self-traveling among a plurality of crop rows (e.g., rows of trees) even in an orchard, a forest, or any other environment where GNSS-based positioning is difficult.

The above and other elements, features, steps, characteristics and advantages of the present invention will become more apparent from the following detailed description of the example embodiments with reference to the attached drawings.

DETAILED DESCRIPTION OF THE EXAMPLE EMBODIMENTS

Figure 1:
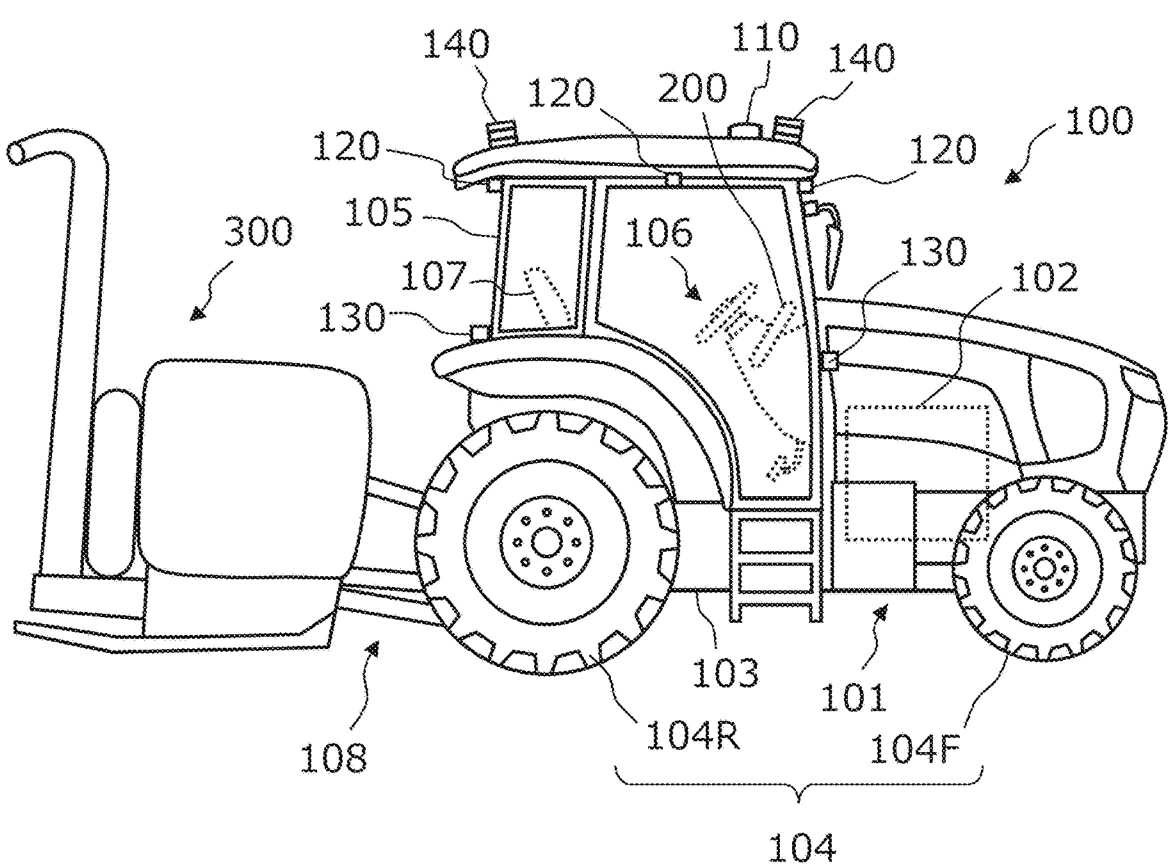
FIG. 1 is a side view schematically showing an example of a work vehicle and an example of an implement linked to the work vehicle.

In the present disclosure, a "work vehicle" means a vehicle for use in performing work in a work area. A "work area" is any place where work may be performed, e.g., a field, a mountain forest, or a construction site. A "field" is any place where agricultural work may be performed, e.g., an orchard, an agricultural field, a paddy field, a cereal farm, or a pasture. A work vehicle can be an agricultural machine such as a tractor, a rice transplanter, a combine, a vehicle for crop management, or a riding mower, or a vehicle for non-agricultural purposes such as a construction vehicle or a snowplow vehicle. A work vehicle may be configured so that an implement that is suitable for the content of work can be attached to at least one of its front and its rear. A work vehicle's traveling while it performs work by using an implement may be referred to as "tasked travel".

"Self-driving" means controlling the travel of a vehicle based on the action of a controller, rather than through manual operation of a driver. During self-driving, not only the travel of the vehicle, but also the task operation (e.g., the operation of the implement) may also be automatically controlled. A vehicle that is traveling via self-driving is said to be "self-traveling". The controller may be configured or programmed to control at least one of steering, adjustment of traveling speed, and starting and stopping of travel as are necessary for the travel of vehicle. In the case of controlling a work vehicle having an implement attached thereto, the controller may be configured or programmed to control operations such as raising or lowering of the implement, starting and stopping of the operation of the implement, and the like. Travel via self-driving includes not only the travel of a vehicle toward a destination along a predetermined path, but also the travel of merely following a target of tracking. A vehicle performing self-driving may travel based in part on a user's instruction. A vehicle performing self-driving may operate not only in a self-driving mode but also in a manual driving mode of traveling through manual operation of the driver. The steering of a vehicle that is based on the action of a controller, rather than manually, is referred to as "automatic steering". A portion or a whole of the controller may be external to the vehicle. Between the vehicle and a controller that is external to the vehicle, communication of control signals, commands, data, or the like may be performed. A vehicle performing self-driving may autonomously travel while sensing the surrounding environment, without any person being involved in the control of the travel of the vehicle. A vehicle that is capable of autonomous travel can travel in an unmanned manner. During autonomous travel, detection of obstacles and avoidance of obstacles may be performed.

An "exterior sensor" is a sensor that senses the external state of the work vehicle. Examples of exterior sensors include LiDAR sensors, cameras (or image sensors), laser range finders (also referred to as "range sensors"), ultrasonic sensors, millimeter wave radars, and magnetic sensors.

A "crop row" is a row of agricultural items, trees, or other plants that may grow in rows on a field, e.g., an orchard or an agricultural field, or in a forest or the like. In the present disclosure, a "crop row" is a notion that encompasses a "row of trees".

An "obstacle map" is local map data in which the position or a region of an object around the work vehicle is expressed in a predetermined coordinate system. A coordinate system defining an obstacle map may be a vehicle coordinate system that is fixed to the work vehicle, or a world coordinate system that is fixed to the globe (e.g. a geographic coordinate system), for example. An obstacle map may include information other than position (e.g., attribute information) of an object around the work vehicle. The obstacle map may be expressed in various formats, e.g., a grid map or a point cloud map.

Hereinafter, example embodiments of the present disclosure will be described more specifically. Note however that unnecessarily detailed descriptions may be omitted. For example, detailed descriptions on what is well known in the art or redundant descriptions on what is substantially the same configuration may be omitted. This is to avoid lengthy description, and facilitate the understanding of those skilled in the art. The accompanying drawings and the following description, which are provided by the present inventors so that those skilled in the art can sufficiently understand the present disclosure, are not intended to limit the scope of claims. In the following description, component elements having identical or similar functions are denoted by identical reference numerals.

The following example embodiments are only examples, and the techniques according to the present disclosure is not limited to the following example embodiments. For example, numerical values, shapes, materials, steps, orders of steps, etc., that are indicated in the following example embodiments are only examples, and admit of various modifications so long as it makes technological sense. Any one implementation may be combined with another.

Hereinafter, as one example, an example embodiment where the work vehicle is a tractor for use in agricultural work in a field such as an orchard will be described. Without being limited to tractors, the techniques according to the present disclosure is also applicable to other type of agricultural machines such as a rice transplanter, a combine, a vehicle for crop management, or a riding lawn mower, for example. The techniques according to the present disclosure is also applicable to vehicles for non-agricultural purposes such as a construction vehicle or a snowplow vehicle.

FIG. 1 is a side view schematically showing an example of the work vehicle 100 and an example of an implement 300 linked to the work vehicle 100. The work vehicle 100 according to the present example embodiment can operate both in a manual driving mode and a self-driving mode. In the self-driving mode, the work vehicle 100 is able to perform unmanned travel. The work vehicle 100 performs self-driving in an environment where a plurality of crop rows (e.g., rows of trees) are planted, e.g., an orchard such as a vineyard or an agricultural field.

As shown in FIG. 1, the work vehicle 100 includes a vehicle body 101, a prime mover (engine) 102, and a transmission 103. On the vehicle body 101, running gear, which includes wheels 104 with tires, and a cabin 105 are provided. The running gear includes four wheels 104, and axles to cause the four wheels to rotate, and brakes to brake on each axle. The wheels 104 include a pair of front wheels 104F and a pair of rear wheels 104R. Inside the cabin 105, a driver's seat 107, a steering device 106, an operational terminal 200, and switches for manipulation are provided. The front wheels 104F and/or the rear wheels 104R may be replaced by a plurality of wheels with a track (crawlers); rather than wheels with tires, attached thereto.

The work vehicle 100 includes a plurality of exterior sensors to sense the surroundings of the work vehicle 100. In the example of FIG. 1, the exterior sensors include a plurality of LIDAR sensors 140, a plurality of cameras 120, and a plurality of obstacle sensors 130.

The cameras 120 may be provided at the front/rear/right/left of the work vehicle 100, for example. The cameras 120 image the surrounding environment of the work vehicle 100 and generate image data. The images acquired with the cameras 120 may be transmitted to the terminal device, which is responsible for remote monitoring, for example. The images may be used to monitor the work vehicle 100 during unmanned driving. The cameras 120 may be provided according to the needs, and any number of them may be provided.

The LiDAR sensors 140 are one example of exterior sensors that output sensor data indicating a distribution of geographic features around the work vehicle 100. In the example of FIG. 1, two LIDAR sensors 140 are disposed on or in the cabin 105, at the front and the rear. The LiDAR sensors 140 may be provided at other positions (e.g., on a lower portion of a front face of the vehicle body 101). While the work vehicle 100 is traveling, each LiDAR sensor 140 repeatedly outputs sensor data representing the distances and directions of measurement points on objects existing in the surrounding environment, or two-dimensional or three-dimensional coordinate values of such measurement points. The number of LiDAR sensors 140 is not limited to two, but may be one, or three or more.

The LiDAR sensor(s) 140 may be configured to output two-dimensional or three-dimensional point cloud data as sensor data. In the present specification, "point cloud data" broadly means data indicating a distribution of multiple reflection points that are observed with a LiDAR sensor(s) 140. The point cloud data may include coordinate values of each reflection point in a two-dimensional space or a three-dimensional space or information indicating the distance and direction of each reflection point, for example. The point cloud data may include information of luminance of each reflection point. The LiDAR sensor(s) 140 may be configured to repeatedly output point cloud data with a pre-designated cycle, for example. Thus, the exterior sensors may include one or more LiDAR sensors 140 that output point cloud data as sensor data.

The sensor data that is output from the LiDAR sensor(s) 140 is processed by a controller configured or programmed to control self-traveling of the work vehicle 100. During travel of the work vehicle 100, based on the sensor data that is output from the LiDAR sensor(s) 140, the controller can consecutively generate an obstacle map indicating a distribution of objects existing around the work vehicle 100. The controller may generate an environment map by joining together obstacle maps with the use of an algorithm such as SLAM, for example, during self-traveling. The controller can perform estimation of the position and orientation of the work vehicle 100 (i.e., localization) by matching the sensor data against the environment map.

The plurality of obstacle sensors 130 shown in FIG. 1 are provided at the front and the rear of the cabin 105. The obstacle sensors 130 may be disposed at other positions. For example, one or more obstacle sensors 130 may be disposed at any position at the sides, the front, or the rear of the vehicle body 101. The obstacle sensors 130 may include, for example, laser scanners or ultrasonic sonars. The obstacle sensors 130 may be used to detect obstacles in the surroundings during self-traveling to cause the work vehicle 100 to halt or detour around the obstacles.

The work vehicle 100 further includes a GNSS unit 110. GNSS is a collective term for satellite positioning systems such as the GPS (Global Positioning System), QZSS (Quasi-Zenith Satellite System, e.g., MICHIBIKI), GLONASS, Galileo, and BeiDou. A GNSS unit 110 receives satellite signals (also referred to as GNSS signals) that are transmitted from a plurality of GNSS satellites, and performs positioning based on the satellite signals. Although the GNSS unit 110 in the present example embodiment is disposed above the cabin 105, it may be disposed at any other position. The GNSS unit 110 includes an antenna to receive signals from the GNSS satellites, and a processing circuit. The work vehicle 100 in the present example embodiment is used in environments where multiple trees grow to make it difficult to use a GNSS, e.g., a vineyard. In such environments, the LiDAR sensor(s) 140 is mainly used in positioning. However, in an environment where it is possible to receive GNSS signals, positioning may be performed by using the GNSS unit 110. By combining the positioning based on the LiDAR sensor(s) 140 and the positioning based on the GNSS unit 110, the stability or accuracy of positioning can be improved.

The GNSS unit 110 may include an inertial measurement unit (IMU). Signals from the IMU can be used to complement position data. The IMU can measure a tilt or a small motion of the work vehicle 100. The data acquired by the IMU can be used to complement the position data based on the satellite signals, so as to improve the performance of positioning.

The prime mover 102 may be a diesel engine, for example. Instead of a diesel engine, an electric motor may be used. The transmission 103 can change the propulsion and the moving speed of the work vehicle 100 through a speed changing mechanism. The transmission 103 can also switch between forward travel and backward travel of the work vehicle 100.

The steering device 106 includes a steering wheel, a steering shaft connected to the steering wheel, and a power steering device to assist in the steering by the steering wheel. The front wheels 104F are the wheels responsible for steering, such that changing their angle of turn (also referred to as "steering angle") can cause a change in the traveling direction of the work vehicle 100. The steering angle of the front wheels 104F can be changed by manipulating the steering wheel. The power steering device includes a hydraulic device or an electric motor to supply an assisting force for changing the steering angle of the front wheels 104F. When automatic steering is performed, under the control of the controller disposed in the work vehicle 100, the steering angle may be automatically adjusted by the power of the hydraulic device or the electric motor.

A linkage device 108 is provided at the rear of the vehicle body 101. The linkage device 108 includes, e.g., a three-point linkage (also referred to as a "three-point link" or a "three-point hitch"), a PTO (Power Take Off) shaft, a universal joint, and a communication cable. The linkage device 108 allows the implement 300 to be attached to, or detached from, the work vehicle 100. The linkage device 108 is able to raise or lower the three-point link with a hydraulic device, for example, thus changing the position or attitude of the implement 300. Moreover, motive power can be sent from the work vehicle 100 to the implement 300 via the universal joint. While towing the implement 300, the work vehicle 100 allows the implement 300 to perform a predetermined task. The linkage device may be provided at the front portion of the vehicle body 101. In that case, the implement can be connected at the front portion of the work vehicle 100.

Although the implement 300 shown in FIG. 1 is a sprayer to spray a chemical agent onto a crop, the implement 300 is not limited to a sprayer. For example, any arbitrary implement such as a mower, a seeder, a spreader, a rake, a baler, a harvester, a plow, a harrow, or a rotary tiller may be connected to the work vehicle 100 for use.

The work vehicle 100 shown in FIG. 1 can be driven by human driving. Alternatively, it may only support unmanned driving. In that case, component elements which are only required for human driving, e.g., the cabin 105, the steering device 106, and the driver's seat 107 do not need to be provided in the work vehicle 100. An unmanned work vehicle 100 can travel via autonomous travel, or by remote manipulation by a user.

Figure 2:
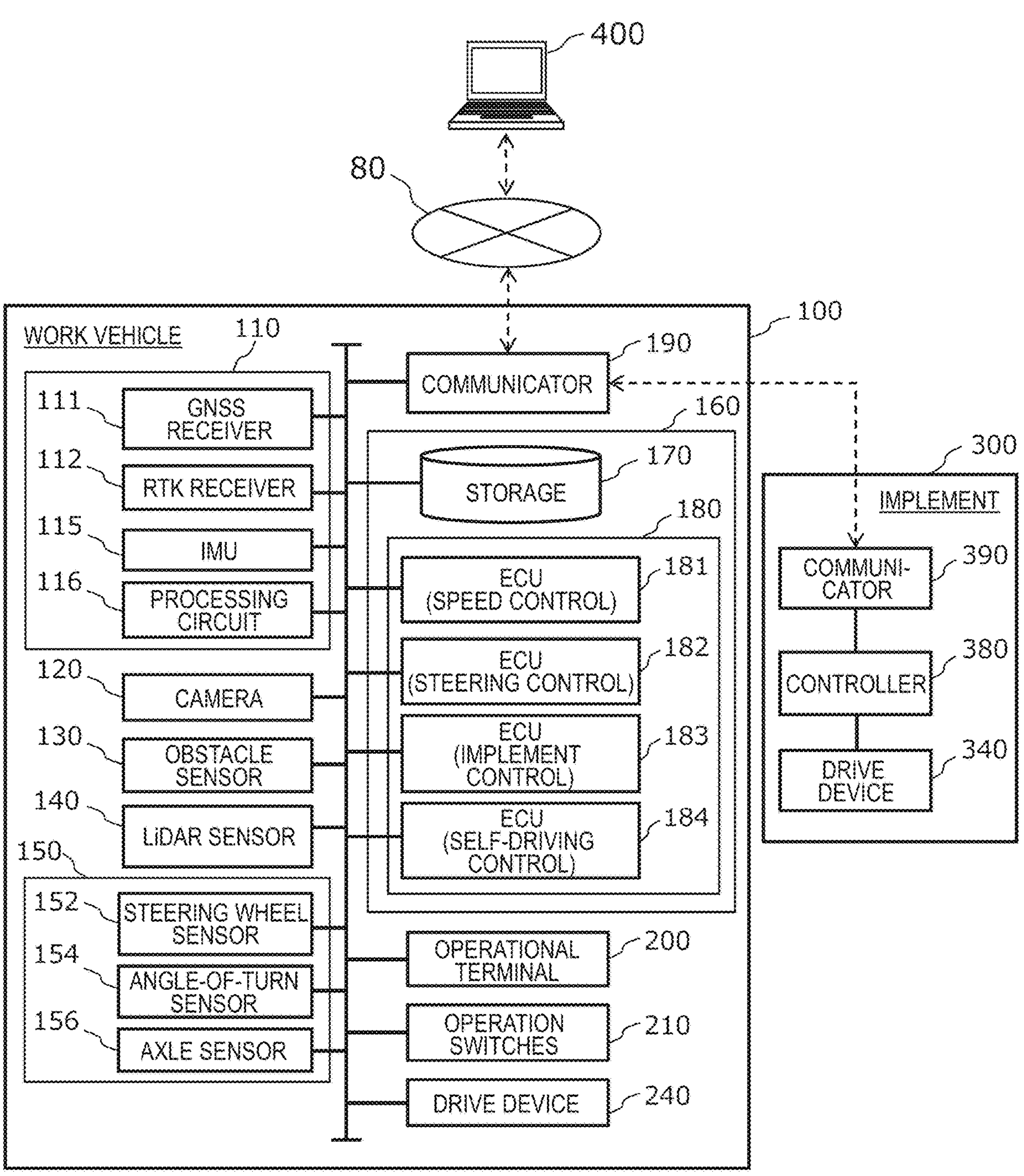
FIG. 2 is a block diagram showing an example configuration of the work vehicle and the implement.

FIG. 2 is a block diagram showing an example configuration of the work vehicle 100 and the implement 300. The work vehicle 100 and the implement 300 can communicate with each other via a communication cable that is included in the linkage device 108. The work vehicle 100 is able to communicate with a terminal device 400 for remote monitoring via a network 80. The terminal device 400 may be any arbitrary computer, e.g., a personal computer (PC), a laptop computer, a tablet computer, or a smartphone, for example.

In addition to the GNSS unit 110, the camera(s) 120, the obstacle sensors 130, the LiDAR sensor(s) 140, and the operational terminal 200, the work vehicle 100 in the example of FIG. 2 includes sensors 150 to detect the operating status of the work vehicle 100, a travel control system 160, a communicator 190, operation switches 210, and a drive device 240. These component elements are communicably connected to one another via a bus.

The GNSS unit 110 includes a GNSS receiver 111, an RTK receiver 112, an inertial measurement unit (IMU) 115, and a processing circuit 116. The sensors 150 include a steering wheel sensor 152, an angle-of-turn sensor 154, and an axle sensor 156. The travel control system 160 includes a storage 170 and a controller 180. The controller 180 includes a plurality of electronic control units (ECU) 181 to 184. The implement 300 includes a drive device 340, a controller 380, and a communicator 390. Note that FIG. 2 shows component elements which are relatively closely related to the operations of self-driving by the work vehicle 100, while other components are omitted from illustration.

The GNSS receiver 111 in the GNSS unit 110 receives satellite signals transmitted from the plurality of GNSS satellites and generates GNSS data based on the satellite signals. The GNSS data is generated in a predetermined format such as, for example, the NMEA-0183 format. The GNSS data may include, for example, the ID number, the angle of elevation, the azimuth angle, and a value representing the reception intensity of each of the satellites from which the satellite signals are received.

The GNSS unit 110 may perform positioning of the work vehicle 100 by utilizing an RTK (Real Time Kinematic)-GNSS. In the positioning based on the RTK-GNSS, not only satellite signals transmitted from a plurality of GNSS satellites, but also a correction signal that is transmitted from a reference station is used. The reference station may be disposed near the work area where the work vehicle 100 performs tasked travel (e.g., at a position within 10 km of the work vehicle 100). The reference station generates a correction signal of, for example, an RTCM format based on the satellite signals received from the plurality of GNSS satellites, and transmits the correction signal to the GNSS unit 110. The RTK receiver 112, which includes an antenna and a modem, receives the correction signal transmitted from the reference station. Based on the correction signal, the processing circuit 116 of the GNSS unit 110 corrects the results of the positioning performed by the GNSS receiver 111. Use of the RTK-GNSS enables positioning with an accuracy on the order of several centimeters of errors, for example. Positional information including latitude, longitude, and altitude information is acquired through the highly accurate positioning by the RTK-GNSS. The GNSS unit 110 calculates the position of the work vehicle 100 as frequently as, for example, one to ten times per second. Note that the positioning method is not limited to being performed by using an RTK-GNSS; any arbitrary positioning method (e.g., an interferometric positioning method or a relative positioning method) that provides positional information with the necessary accuracy can be used. For example, positioning may be performed by utilizing a VRS (Virtual Reference Station) or a DGPS (Differential Global Positioning System).

The GNSS unit 110 according to the present example embodiment further includes the IMU 115. The IMU 115 may include a 3-axis accelerometer and a 3-axis gyroscope. The IMU 115 may include a direction sensor such as a 3-axis geomagnetic sensor. The IMU 115 functions as a motion sensor which can output signals representing parameters such as acceleration, velocity, displacement, and attitude of the work vehicle 100. Based not only on the satellite signals and the correction signal but also on a signal that is output from the IMU 115, the processing circuit 116 can estimate the position and orientation of the work vehicle 100 with a higher accuracy. The signal that is output from the IMU 115 may be used for the correction or complementation of the position that is calculated based on the satellite signals and the correction signal. The IMU 115 outputs a signal more frequently than the GNSS receiver 111. For example, the IMU 115 outputs a signal as frequently as approximately several ten times to several thousand times per second. Utilizing this signal that is output highly frequently, the processing circuit 116 allows the position and orientation of the work vehicle 100 to be measured more frequently (e.g., about 10 Hz or above). Instead of the IMU 115, a 3-axis accelerometer and a 3-axis gyroscope may be separately provided. The IMU 115 may be provided as a separate device from the GNSS unit 110.

The cameras 120 are imagers that image the surrounding environment of the work vehicle 100. Each camera 120 includes an image sensor such as a CCD (Charge Coupled Device) or a CMOS (Complementary Metal Oxide Semiconductor), for example. In addition, each camera 120 may include an optical system including one or more lenses and a signal processing circuit. During travel of the work vehicle 100, the cameras 120 image the surrounding environment of the work vehicle 100, and generate image (e.g., motion picture) data. The cameras 120 are able to capture motion pictures at a frame rate of 3 frames/second (fps: frames per second) or greater, for example. The images generated by the cameras 120 may be used by a remote supervisor to check the surrounding environment of the work vehicle 100 with the terminal device 400, for example. The images generated by the cameras 120 may also be used for the purpose of positioning or detection of obstacles. As shown in FIG. 1, the plurality of cameras 120 may be provided at different positions on the work vehicle 100, or a single camera 120 may be provided. A visible camera(s) to generate visible images and an infrared camera(s) to generate infrared images may be separately provided. Both of a visible camera(s) and an infrared camera(s) may be provided as a camera(s) for generating images for monitoring purposes. The infrared camera(s) may also be used for detection of obstacles at nighttime.

An obstacle sensor 130 detects objects around the work vehicle 100. The obstacle sensor 130 may include a laser scanner or an ultrasonic sonar, for example. When an object exists at a position closer to the obstacle sensor 130 than a predetermined distance, the obstacle sensor 130 outputs a signal indicating the presence of an obstacle. A plurality of obstacle sensors 130 may be provided at different positions of the work vehicle 100. For example, a plurality of laser scanners and a plurality of ultrasonic sonars may be disposed at different positions of the work vehicle 100. Providing a multitude of obstacle sensors 130 can reduce blind spots in monitoring obstacles around the work vehicle 100.

The steering wheel sensor 152 measures the angle of rotation of the steering wheel of the work vehicle 100. The angle-of-turn sensor 154 measures the angle of turn of the front wheels 104F, which are the wheels responsible for steering. Measurement values by the steering wheel sensor 152 and the angle-of-turn sensor 154 may be used for steering control by the controller 180.

The axle sensor 156 measures the rotational speed, i.e., the number of revolutions per unit time, of an axle that is connected to the wheels 104. The axle sensor 156 may be a sensor including a magnetoresistive element (MR), a Hall generator, or an electromagnetic pickup, for example. The axle sensor 156 outputs a numerical value indicating the number of revolutions per minute (unit: rpm) of the axle, for example. The axle sensor 156 is used to measure the speed of the work vehicle 100. Measurement values from the axle sensor 156 can be utilized for the speed control by the controller 180.

The drive device 240 includes various types of devices required to cause the work vehicle 100 to travel and to drive the implement 300. For example, the prime mover 102, the transmission 103, the steering device 106, the linkage device 108 and the like described above. The prime mover 102 may include an internal combustion engine such as, for example, a diesel engine. The drive device 240 may include an electric motor for traction instead of, or in addition to, the internal combustion engine.

The storage 170 includes one or more storage media such as a flash memory or a magnetic disc. The storage 170 stores various data that is generated by the GNSS unit 110, the camera(s) 120, the obstacle sensor(s) 130, the LiDAR sensor(s) 140, the sensors 150, and the controller 180. The data that is stored by the storage 170 may include an environment map of the environment where the work vehicle 100 travels, an obstacle map that is consecutively generated during travel, and path data for self-driving. The storage 170 also stores a computer program(s) to cause each of the ECUs in the controller 180 to perform various operations described below. Such a computer program(s) may be provided to the work vehicle 100 via a storage medium (e.g., a semiconductor memory, an optical disc, etc.) or through telecommunication lines (e.g., the Internet). Such a computer program(s) may be marketed as commercial software.

The controller 180 is configured or programmed to include the plurality of ECUs. The plurality of ECUs include, for example, the ECU 181 for speed control, the ECU 182 for steering control, the ECU 183 for implement control, and the ECU 184 for self-driving control.

The ECU 181 is configured or programmed to control the prime mover 102, the transmission 103, and brakes included in the drive device 240, thus controlling the speed of the work vehicle 100.

The ECU 182 is configured or programmed to control the hydraulic device or the electric motor included in the steering device 106 based on a measurement value of the steering wheel sensor 152, thus controlling the steering of the work vehicle 100.

In order to cause the implement 300 to perform a desired operation, the ECU 183 is configured or programmed to control the operations of the three-point link, the PTO shaft and the like that are included in the linkage device 108. Also, the ECU 183 is configured or programmed to generate a signal to control the operation of the implement 300, and transmits this signal from the communicator 190 to the implement 300.

Based on data output from the GNSS unit 110, the camera(s) 120, the obstacle sensor(s) 130, the LiDAR sensor(s) 140, and the sensors 150, the ECU 184 is configured or programmed to perform computation and control for achieving self-driving. For example, the ECU 184 is configured or programmed to estimate the position of the work vehicle 100 based on the data output from at least one of the GNSS unit 110, the camera(s) 120, and the LiDAR sensor(s) 140. In a situation where a sufficiently high reception intensity exists for the satellite signals from the GNSS satellites, the ECU 184 may determine the position of the work vehicle 100 based only on the data output from the GNSS unit 110. On the other hand, in an environment where obstructions, such as trees, that may hinder reception of the satellite signals exist around the work vehicle 100, e.g., an orchard, the ECU 184 is configured or programmed to estimate the position of the work vehicle 100 by using the data output from the LiDAR sensor(s) 140 or the camera(s) 120. During self-driving, the ECU 184 is configured or programmed to perform computation necessary for the work vehicle 100 to travel along a target path, based on the estimated position of the work vehicle 100. The ECU 184 sends the ECU 181 a command to change the speed, and sends the ECU 182 a command to change the steering angle. In response to the command to change the speed, the ECU 181 controls the prime mover 102, the transmission 103, or the brakes to change the speed of the work vehicle 100. In response to the command to change the steering angle, the ECU 182 controls the steering device 106 to change the steering angle.

Through the actions of these ECUs, the controller 180 realizes self-traveling. During self-traveling, the controller 180 is configured or programmed to control the drive device 240 based on the measured or estimated position of the work vehicle 100 and on the consecutively-generated target path. As a result, the controller 180 can cause the work vehicle 100 to travel along the target path.

The plurality of ECUs included in the controller 180 can communicate with one another in accordance with a vehicle bus standard such as, for example, a CAN (Controller Area Network). Instead of a CAN, faster communication methods such as Automotive Ethernet (registered trademark) may be used. Although the ECUs 181 to 184 are illustrated as individual blocks in FIG. 2, the function of each of the ECU 181 to 184 may be implemented by a plurality of ECUs. Alternatively, an onboard computer that integrates the functions of at least some of the ECUs 181 to 184 may be provided. The controller 180 may include ECUs other than the ECUs 181 to 184, and any number of ECUs may be provided in accordance with functionality. Each ECU includes a processing circuit including one or more processors.

The communicator 190 includes a circuit communicating with the implement 300 and the terminal device 400. The communicator 190 includes circuitry to perform exchanges of signals complying with an ISOBUS standard such as ISOBUS-TIM, for example, between itself and the communicator 390 of the implement 300. This allows the implement 300 to perform a desired operation, or allows information to be acquired from the implement 300. The communicator 190 may further include an antenna and a communication circuit to exchange signals via the network 80 with the respective communicators of the terminal device 400. The network 80 may include a 3G, 4G, 5G, or any other cellular mobile communications network and the Internet, for example. The communicator 190 may have a function of communicating with a mobile terminal that is used by a supervisor who is situated near the work vehicle 100. With such a mobile terminal, communication may be performed based on any arbitrary wireless communication standard, e.g., Wi-Fi (registered trademark), 3G, 4G, 5G or any other cellular mobile communication standard, or Bluetooth (registered trademark).

The operational terminal 200 is a terminal for the user to perform a manipulation related to the travel of the work vehicle 100 and the operation of the implement 300, and is also referred to as a virtual terminal (VT). The operational terminal 200 may include a display device such as a touch screen panel, and/or one or more buttons. The display device may be a display such as a liquid crystal display or an organic light-emitting diode (OLED) display, for example. By manipulating the operational terminal 200, the user can perform various manipulations, such as, for example, switching ON/OFF the self-driving mode, and switching ON/OFF the implement 300. At least a portion of these manipulations may also be realized by manipulating the operation switches 210. The operational terminal 200 may be configured so as to be detachable from the work vehicle 100. A user who is at a remote place from the work vehicle 100 may manipulate the detached operational terminal 200 to control the operation of the work vehicle 100.

The drive device 340 in the implement 300 shown in FIG. 2 performs operations necessary for the implement 300 to perform predetermined work. The drive device 340 includes a device suitable for uses of the implement 300, for example, a hydraulic device, an electric motor, a pump or the like. The controller 380 is configured or programmed to control the operation of the drive device 340. In response to a signal that is transmitted from the work vehicle 100 via the communicator 390, the controller 380 is configured or programmed to cause the drive device 340 to perform various operations. Moreover, a signal that is in accordance with the state of the implement 300 can be transmitted from the communicator 390 to the work vehicle 100.

Figure 3A:
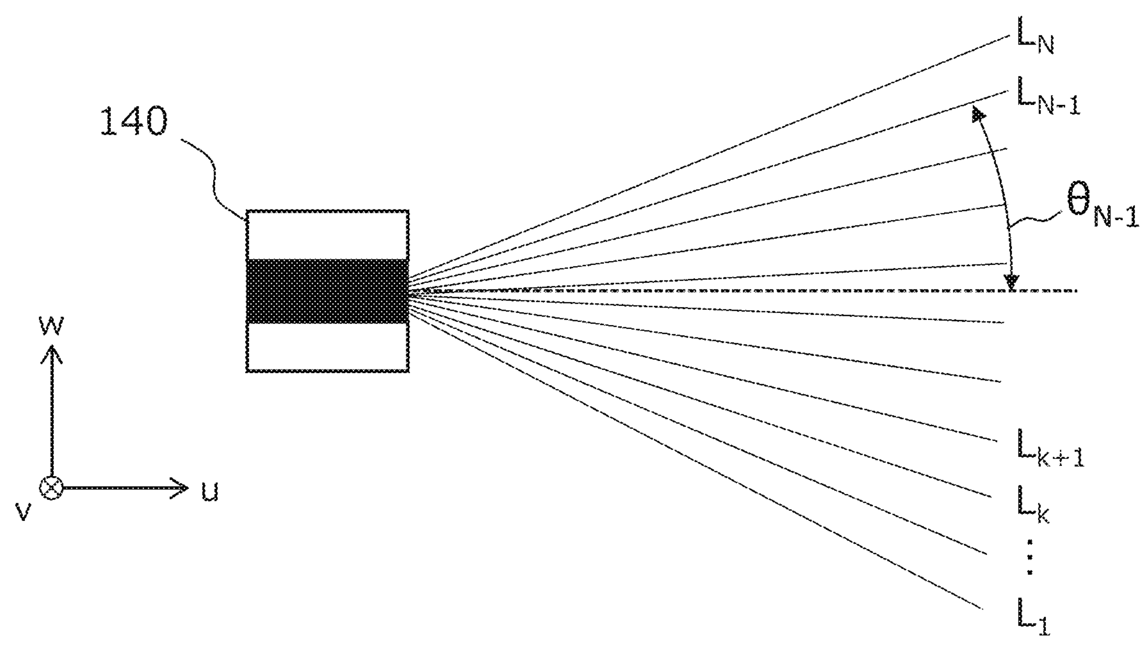
FIG. 3A is a schematic diagram of a LiDAR sensor as viewed in a lateral direction of the work vehicle.
Figure 3B:
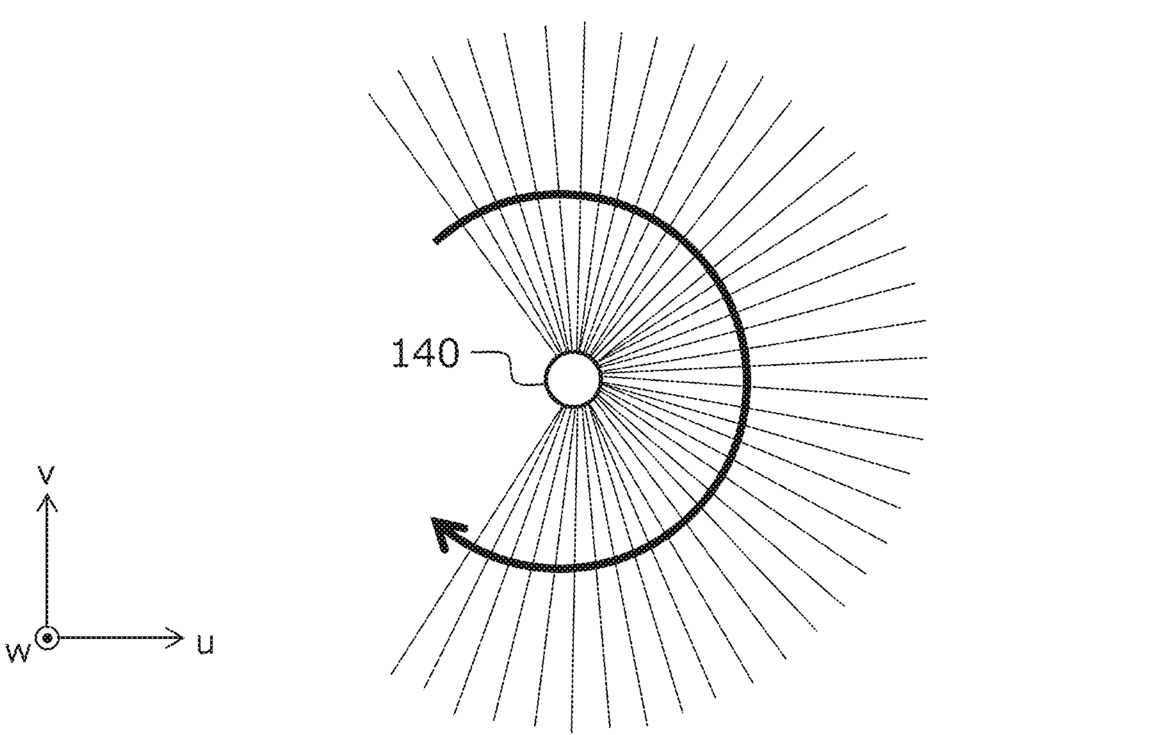
FIG. 3B is a schematic diagram of a LiDAR sensor as viewed from vertically above.

Next, with reference to FIG. 3A and FIG. 3B, an example configuration of the LiDAR sensor 140 will be described. The LiDAR sensor 140 in the present example embodiment is a scan-type sensor capable of acquiring information on the distance distribution of objects within a space by laser beam scanning. FIG. 3A is a schematic diagram of the LiDAR sensor 140 as viewed in a lateral direction of the work vehicle 100. FIG. 3B is a schematic diagram of the LiDAR sensor 140 as viewed from vertically above. In FIG. 3A and FIG. 3B are shown three axes u, v and w in a sensor coordinate system that is fixed to the LiDAR sensor 140, which are orthogonal to one another. In FIG. 3A and FIG. 3B, straight lines extending radially schematically represent the center axes (or traveling directions) of laser beams emitted from the LiDAR sensor 140. Although each laser beam is collimated into parallel light, it has an angle of spread of several milliradians (e.g., 0.1 to 0.2 degrees). Therefore, the cross-sectional size (spot diameter) of each laser beam increases in proportion to distance from the LIDAR sensor 140. For example, a light spot with a diameter of several centimeters may be formed 20 meters away from the LiDAR sensor 140. In the figures, for simplicity, the spread of each laser beam is ignored, and only the center axis of the laser beam is illustrated.

The LiDAR sensor 140 in the example of FIG. 3A is able to emit laser beams from a plurality of laser light sources that are arranged along the vertical direction, respectively at different angles of elevation. An angle of elevation is defined as an angle relative to the uv plane. In this example, the uv plane is essentially parallel to the horizontal plane. Note that, when the ground surface is inclined with respect to the horizontal plane, the uv plane and the horizontal plane will intersect. FIG. 3A illustrates N laser beams Li to LN being emitted. Herein, "N" is an integer of 1 or greater, and may be e.g. 10 or greater, and 64, or even 100 or greater, for high-performance models. Among the plurality of laser beams, a $k^{th}$ laser beam from the bottom has an angle of elevation $\theta_k$. As one example, FIG. 3A shows an angle of elevation $\theta_{N-1}$ of an $N-1^{th}$ laser beam. The angle of elevation of any laser beam going upward from the uv plane is defined as a "positive angle of elevation", whereas the angle of elevation of any laser beam going downward from the uv plane is defined as a "negative angle of elevation".

A LIDAR sensor having an N of 1 may be referred to as a "two-dimensional LiDAR", while a LiDAR sensor having an N of 2 or more may be referred to as a "three-dimensional LiDAR". When N is 2 or more, the angle made by the first laser beam and an $N^{th}$ laser beam is referred to as the "vertical viewing angle". The vertical viewing angle may be set in a range from about 20° to 60°, for example.

As shown in FIG. 3B, the LiDAR sensor 140 is able to change the outgoing directions (e.g., azimuth angles) of laser beams. FIG. 3B shows the outgoing directions of the plurality of laser beams shown in FIG. 3A as rotating around a rotation axis that is parallel to the w axis. The range of the outgoing directions (azimuth angles) of the laser beams may be 360°, or an angle range that is smaller than 360° (e.g., 210° or 270°). The range of azimuth angles of the outgoing directions of laser beams is referred to as the "horizontal viewing angle". The horizontal viewing angle may be set in a range from about 90° to 360°, for example. While rotating the outgoing directions of laser beams around a rotation axis that is parallel to the w axis, the LiDAR sensor 140 sequentially emits pulsed laser light (laser pulses) in directions of different azimuth angles. Thus, with pulsed laser light emitted at different angles of elevation and different azimuth angles, it is possible to measure the distance to each reflection point. Each reflection point corresponds to each individual point included in the point cloud data. The operation of measuring the distance to each reflection point while the azimuth angles of laser beams make one rotation around the rotation axis is referred to as one scan. Sensor data that is obtained through one scan includes data that is measured for every layer that is associated with a certain angle of elevation as shown in FIG. 3A. Therefore, the greater the number of layers is, the greater the number of points in the point cloud that are obtained through one scan for the same environment. The LiDAR sensor 140 repeats scan operations with a frequency of about 1 to 20 times per second, for example. During one scan operation, 100,000 or more pulses of laser light may be emitted in different directions, for example.

Figure 4:
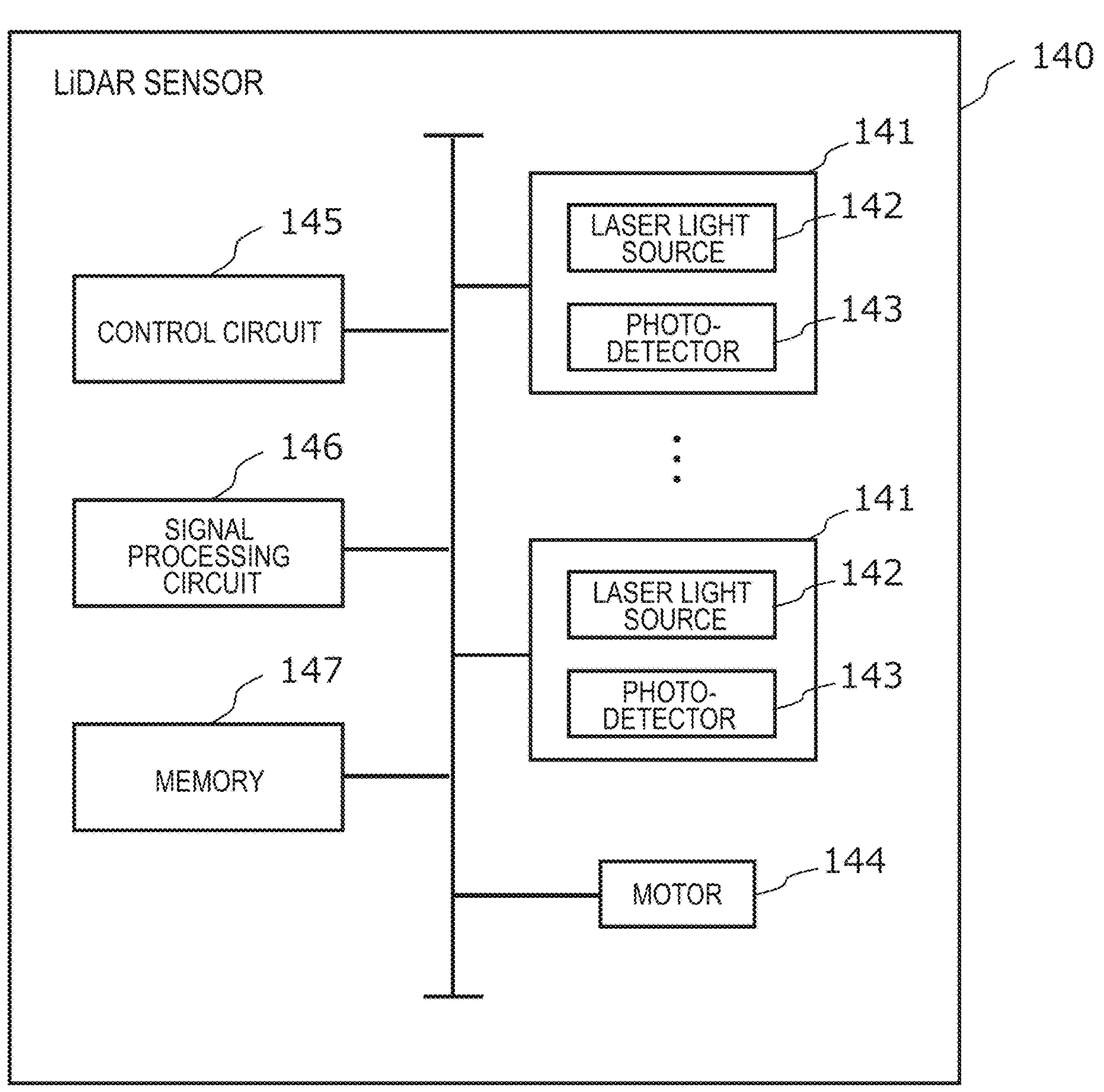
FIG. 4 is a block diagram showing an example configuration of the LiDAR sensor.

FIG. 4 is a block diagram showing an example schematic configuration of the LiDAR sensor 140. As shown in FIG. 4, the LiDAR sensor 140 includes a plurality of laser units 141, an electric motor 144, a control circuit 145, a signal processing circuit 146, and a memory 147. Each laser unit 141 includes a laser light source 142 and a photodetector 143. Each laser unit 141 may include optics such as a lens(es) and a mirror(s), but they are omitted from illustration. By rotating a mirror that is placed on the optical path of a laser beam emitted from each laser light source 142, for example, the motor 144 changes the direction of the laser beam emitted from the respective laser light source 142.

Each laser light source 142 includes a laser diode, and emits a pulsed laser beam of a predetermined wavelength in response to a command from the control circuit 145. The wavelength of the laser beam may be a wavelength that is included in the near-infrared wavelength region (approximately 700 nm to 2.5 μm), for example. The wavelength used depends on the material of the photoelectric conversion element used for the photodetector 143. In the case where silicon (Si) is used as the material of the photoelectric conversion element, for example, a wavelength around 900 nm may be mainly used. In the case where indium gallium arsenide (InGaAs) is used as the material of the photoelectric conversion element, a wavelength of not less than 1000 nm and not more than 1650 nm may be used, for example. Note that the wavelength of the laser beam is not limited to the near-infrared wavelength region. In applications where influences of ambient light are not a problem (e.g., for nighttime use), a wavelength included in the visible region (approximately 400 nm to 700 nm) may be used. Depending on the application, the ultraviolet wavelength region may also be used. In the present specification, any radiation in the ultraviolet, visible light, and infrared wavelength regions in general is referred to as "light".

Each photodetector 143 is a device to detect laser pulses that are emitted from the laser light source 142 and reflected or scattered by an object. The photodetector 143 includes a photoelectric conversion element such as an avalanche photodiode (APD), for example. The photodetector 143 outputs an electrical signal which is in accordance with the amount of received light.

In response to a command from the control circuit 145, the motor 144 rotates the mirror that is placed on the optical path of a laser beam emitted from each laser light source 142. This realizes a scan operation that changes the outgoing directions of laser beams.

The control circuit 145 controls emission of laser pulses by the laser light sources 142, detection of reflection pulses by the photodetectors 143, and rotational operation by the motor 144. The control circuit 145 may include a circuit that includes a processor, e.g., a microcontroller unit (MCU), for example.

The signal processing circuit 146 is a circuit to perform computations based on signals that are output from the photodetectors 143. The signal processing circuit 146 uses ToF (Time of Flight) techniques to calculate a distance to an object that has reflected a laser pulse emitted from a laser light source 142, for example. ToF techniques include direct ToF and indirect ToF. Under direct ToF, the time from the emission of a laser pulse from the laser light source 142 until reflected light is received by the photodetector 143 is directly measured to calculate the distance to the reflection point. Under indirect ToF, a plurality of exposure periods are set in the photodetector 143, and the distance to each reflection point is calculated based on a ratio of light amounts detected in the respective exposure periods. Either the direct ToF or indirect ToF method may be used. The signal processing circuit 146 generates and outputs sensor data indicating the distance to each reflection point and the direction of that reflection point, for example. Furthermore, the signal processing circuit 146 may calculate coordinates (u,v) or (u,v,w) in the sensor coordinate system based on the distance to each reflection point and the direction of that reflection point, and include these in the sensor data for output.

Although the control circuit 145 and the signal processing circuit 146 are two separate circuits in the example of FIG. 4, they may be implemented as a single circuit.

The memory 147 is a storage medium to store data that is generated by the control circuit 145 and the signal processing circuit 146. For example, the memory 147 stores data that associates the emission timing of a laser pulse emitted from each laser unit 141, the outgoing direction, the reflected light intensity, the distance to the reflection point, and the coordinates (u,v) or (u,v,w) in the sensor coordinate system. Such data is generated each time a laser pulse is emitted, and recorded to the memory 147. The control circuit 145 outputs such data with a predetermined cycle (e.g., the length of time required to emit a predetermined number of pulses, a half scan period, or one scan period). The output data is recorded in the storage 170 of the work vehicle 100.

The LiDAR sensor 140 outputs sensor data with a frequency of about 1 to 20 times per second, for example. This sensor data may include the coordinates of multiple points expressed by the sensor coordinate system, and time stamp information. The sensor data may include the information of distance and direction toward each reflection point but not include coordinate information. In such cases, the controller 180 performs conversion from the distance and direction information into coordinate information.

Note that the method of distance measurement is not limited to the ToF techniques, but other methods such as the FMCW (Frequency Modulated Continuous Wave) techniques may also be used. In the FMCW techniques, light whose frequency is linearly changed is emitted, and distance is calculated based on the frequency of beats that occur due to interferences between the emitted light and the reflected light.

As described above, the LiDAR sensor(s) 140 according to the present example embodiment may be scan-type sensors, which acquire information on the distance distribution of objects in space by scanning a laser beam. However, the LiDAR sensors 140 are not limited to scan-type sensors. For example, the LiDAR sensor(s) 140 may be flash-type sensors, which acquire information on the distance distribution of objects in space by using light diffused over a wide area. A scan-type LiDAR sensor uses a higher intensity light than does a flash-type LiDAR sensor, and thus can acquire distance information at a greater distance. On the other hand, flash-type LiDAR sensors are suitable for applications that do not require intense light because they are simple in structure and can be manufactured at low cost.

Next, an operation of the work vehicle 100 will be described.

Figure 5:
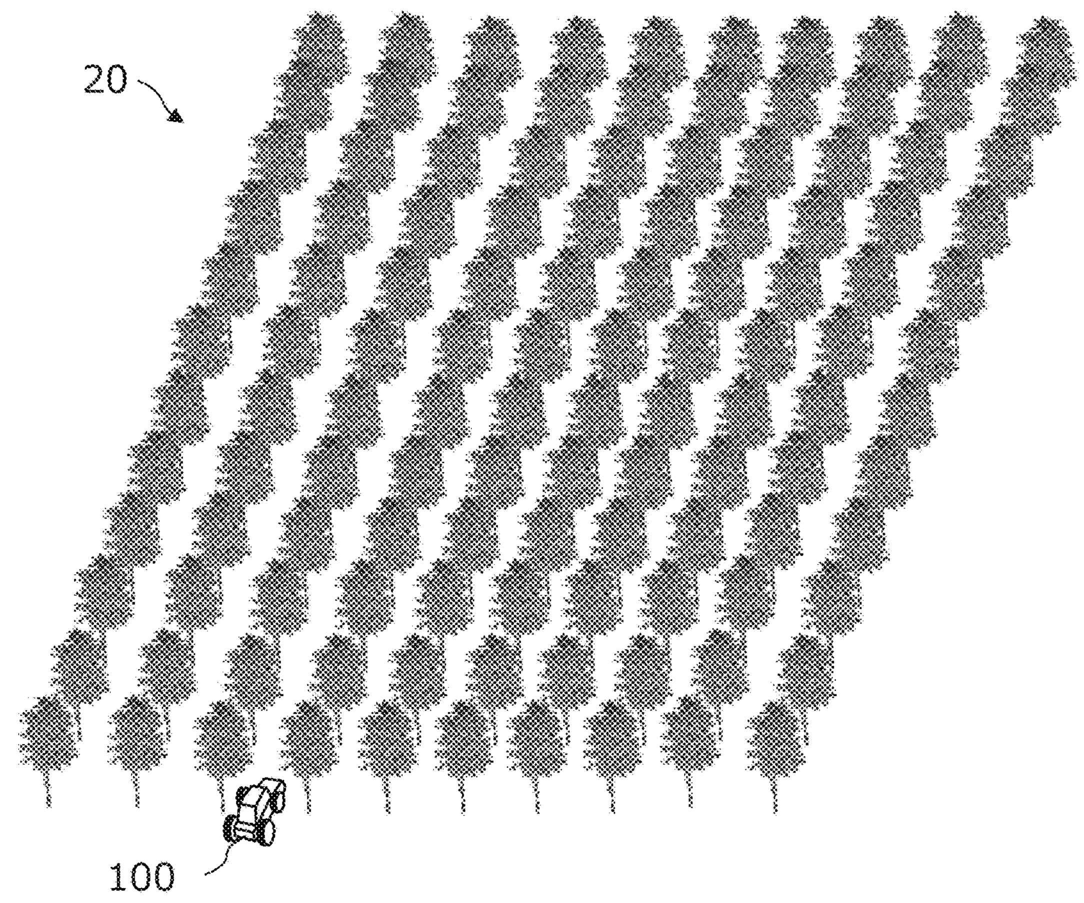
FIG. 5 is a diagram schematically showing an example of an environment in which the work vehicle travels.
Figure 6:
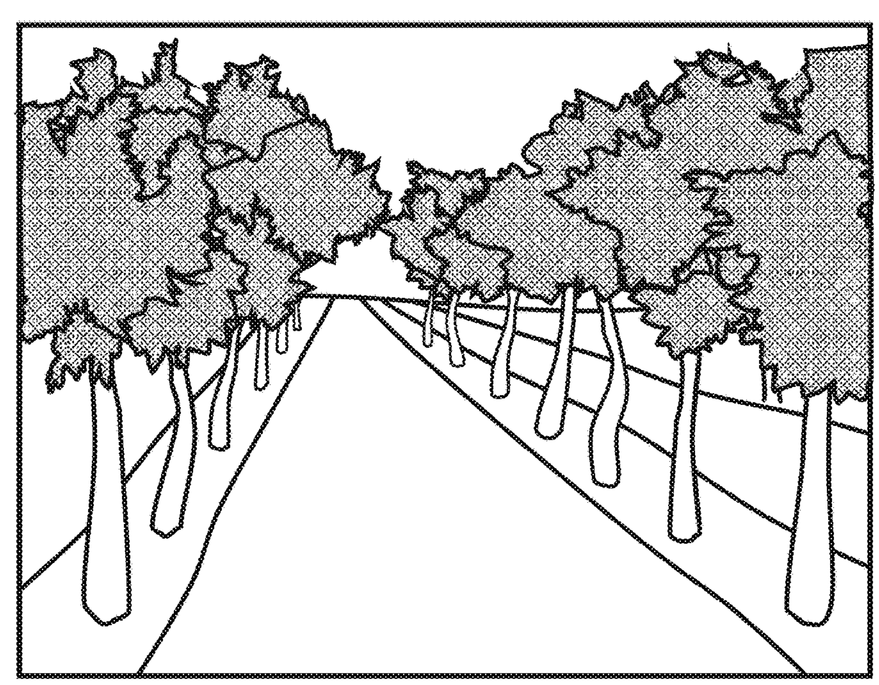
FIG. 6 is a perspective view schematically showing an example of a surrounding environment of the work vehicle.

FIG. 5 is a diagram schematically showing an example of an environment in which the work vehicle 100 travels. FIG. 6 is a perspective view schematically showing an example of the surrounding environment of the work vehicle 100. In this example, while traveling between rows of trees 20 (i.e., crop rows) in an orchard such as a vineyard, the work vehicle 100 uses the implement 300 to perform predetermined tasks (e.g., spreading chemical agents, mowing, preventive pest control, or the like). The sky over an orchard is obstructed by branches and leaves, thus hindering self-traveling using a GNSS. In an environment where a GNSS cannot be used, it may be conceivable to travel while performing localization through matching between an environment map that is created in advance and the sensor data. However, in a field such as an orchard, the outer shapes of the leaves of trees or other crops or hedges may change significantly with seasons, thus making it difficult to continue using an environment map that is created in advance. Moreover, in a conventional self-driving agricultural machine, information such as positions of crop rows, shape of the field, and positions of headland areas is set in advance, and a path for self-traveling is generated based on such information. In a vast field, however, it is considerable work to set the positions of crop rows in advance.

Therefore, the controller 180 according to the present example embodiment is configured or programmed to detect two crop rows existing on opposite sides of the work vehicle 100 based on sensor data that is output from the LiDAR sensor(s) 140, and cause the work vehicle 100 to travel along a path between the two crop rows. Furthermore, upon detecting an end of a crop row based on the sensor data, the controller 180 is configured or programmed to set a coordinate system for turning travel and a target point for the turning travel, and causes \ the work vehicle 100 to turn toward the target point based on the coordinate system. Such an operation allows for solving the aforementioned problem, and smoothly performing self-traveling among a plurality of crop rows and making turns.

Figure 7A:
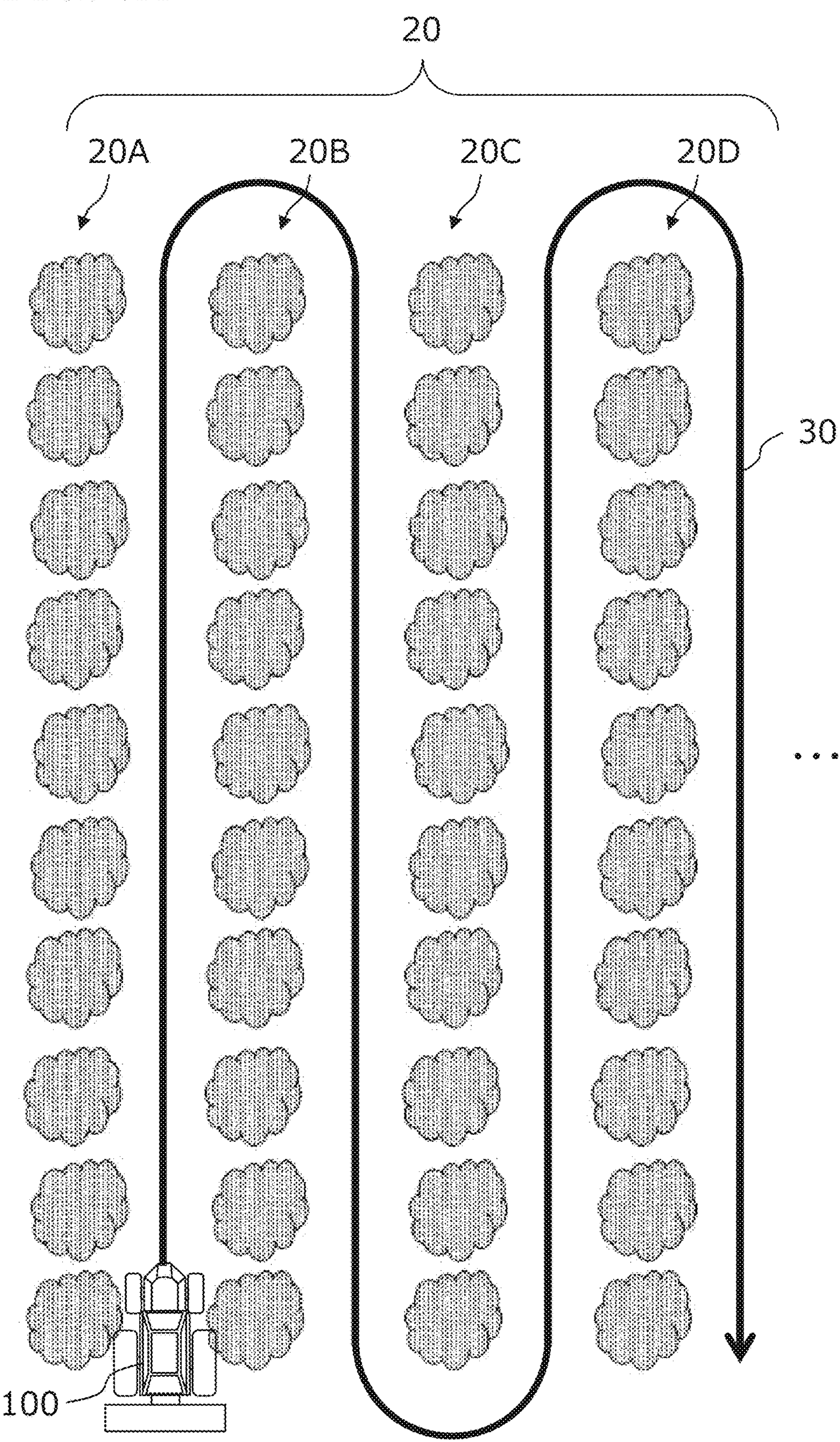
FIG. 7A is a diagram showing schematically an example of a travel path of the work vehicle.
Figure 7B:
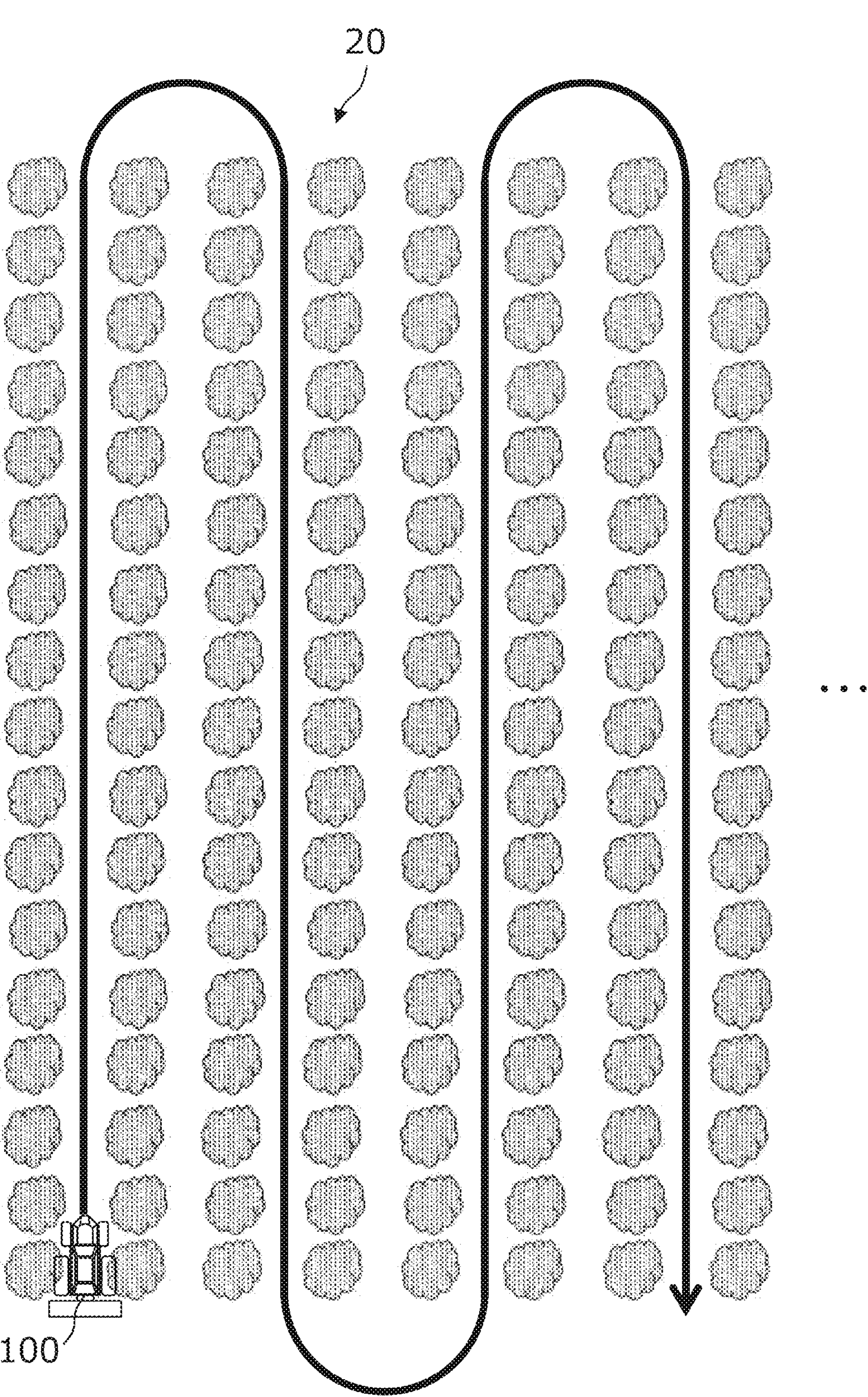
FIG. 7B is a diagram showing schematically another example of a travel path of the work vehicle.

FIG. 7A is a diagram showing schematically an example of a travel path 30 of the work vehicle 100. The work vehicle 100 travels among rows of trees 20 along the path 30 as illustrated. Although FIG. 7A illustrates any line segment included in the path 30 to be a straight line, the path along which the work vehicle 100 actually travels may include meandering portions. Now, the plurality of rows of trees 20 are sequentially designated as a first row of trees 20A, a second row of trees 20B, a third row of trees 20C, a fourth row of trees 20D, etc., from the end. In the example of FIG. 7A, the work vehicle 100 first travels between the first row of trees 20A and the second row of trees 20B, and upon completing this travel, turns right to travel between the second row of trees 20B and the third row of trees 20C in the opposite direction. Once the travel between the second row of trees 20B and the third row of trees 20C is completed, it further turns left to travel between the third row of trees 20C and the fourth row of trees 20D. Thereafter, by repeating a similar operation, it travels to the final end of the path 30, which will be in between the last two rows of trees. In the case where the interval between two adjacent rows of trees is short, as shown in FIG. 7B, it may travel so as to go along every other row. In this case, after the travel between the last two rows of trees is completed, an operation of traveling between untraveled rows of trees, so as to go along every other row, may be performed. Such travel is automatically performed by the work vehicle 100, based on sensor data that is output from the LiDAR sensor(s) 140.

At timings when the GNSS unit 110 is able to receive a GNSS signal, positioning may be conducted based on the GNSS signal. For example, at any timing of turning around along the path 30 illustrated in either FIG. 7A or FIG. 7B, no leaves exist to obstruct the GNSS signal, and therefore positioning based on the GNSS signal is possible.

The controller 180 of the work vehicle 100 according to the present example embodiment is configured or programmed to operate in an inter-row travel mode of causing the work vehicle 100 to travel along a path between two adjacent rows of trees, and a turning travel mode of causing the work vehicle 100 to turn in a headland. A headland is a region between an end of each row of trees and the boundary of the orchard. In the inter-row travel mode, based on the sensor data being consecutively output from the LiDAR sensor(s) 140, the controller 180 detects two rows of trees existing on opposite sides of the work vehicle 100, and while setting a path in between the two rows of trees, causes the work vehicle 100 to travel along the path. Upon detecting an end of at least the row of trees corresponding to the turning direction (right or left) between the two adjacent rows of trees, the controller 180 sets a coordinate system for turning travel and a target point of turn. Hereinafter, a coordinate system for turning travel may be referred to as a "turning coordinate system". A turning coordinate system is a coordinate system that is fixed to the ground surface, and is used for controlling the turning travel. The target point is an entrance point of a next instance of inter-row travel. After setting the turning coordinate system and the target point of turn, once the work vehicle 100 arrives at an end of the row of trees, it transitions to the turning travel mode. In the turning travel mode, the controller 180 causes the work vehicle 100 to travel along a turning path that is set on the turning coordinate system. Specifically, based on the sensor data being consecutively output from the LiDAR sensor(s) 140, the controller 180 causes the work vehicle 100 to travel along the turning path, while performing localization for the work vehicle 100 on the turning coordinate system. In the turning travel mode, the controller 180 may utilize not only the sensor data but also utilize a signal that is output from the GNSS receiver 111 and/or a signal that is output from the IMU 115 to perform positioning. When the work vehicle 100 arrives at the target point of turn, it again transitions to the inter-row travel mode. Thereafter, similar operations are repeated until the last instance of inter-row travel is finished. Through the above operation, self-traveling between rows of trees 20 is achieved. The above control is realized by the ECU 184 of the controller 180.

Figure 8:
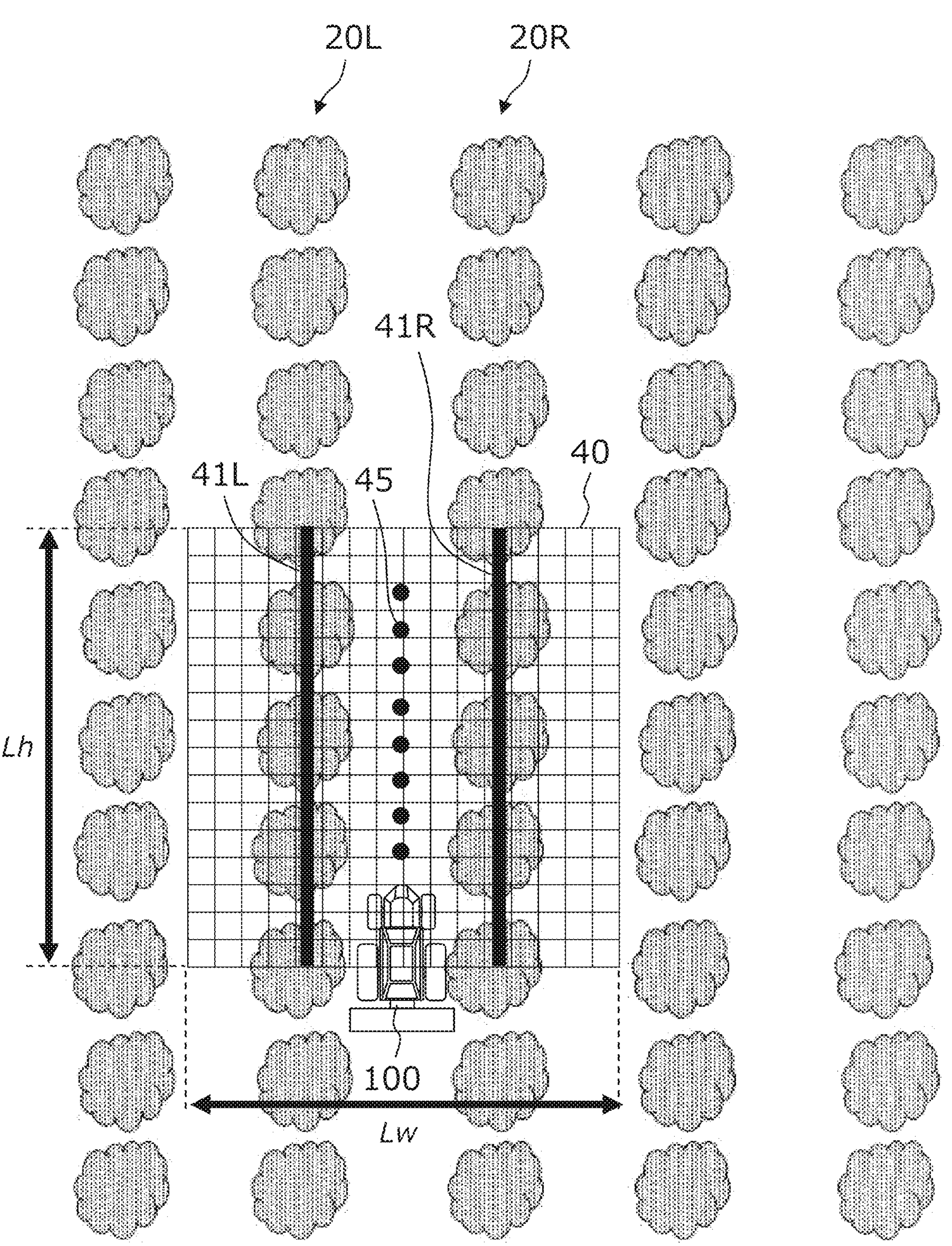
FIG. 8 is a diagram for describing a method of travel control for the work vehicle in an inter-row travel mode.

FIG. 8 is a diagram for describing a method of travel control for the work vehicle 100 in the inter-row travel mode. While traveling between two adjacent rows of trees 20R and 20L, the work vehicle 100 scans the surrounding environment with a laser beam, by using the LiDAR sensor(s) 140. As a result, data indicating a distance distribution of objects existing in the environment is acquired. The data indicating the distance distribution is converted into two-dimensional or three-dimensional point cloud data, for example, and output as sensor data. During travel of the work vehicle 100, the controller 180 consecutively generates the obstacle map 40 based on the sensor data that is output from the LiDAR sensor(s) 140. The obstacle map 40 represents a distribution of objects in a vehicle coordinate system that is fixed to the work vehicle 100. The obstacle map 40 has a predetermined length Lh and width Lw. The length Lh is a longitudinal size corresponding to the traveling direction of the work vehicle 100. The width Lw is a lateral size that is perpendicular to both of the traveling direction of the work vehicle 100 and the vertical direction.

In the example shown in FIG. 8, the controller 180 detects two rows of trees 20R and 20L existing on opposite sides of the work vehicle 100, based on the obstacle map 40. Specifically, the controller 180 subjects the obstacle map 40 to a Hough transform or other processing to derive approximate straight lines (line segments) 41R and 41L for the rows of trees 20R and 20L. The controller 180 sets a target path 45 between the approximate straight lines 41R and 41L (e.g., in the middle). In a case where the plurality of trees in the rows of trees 20R and 20L are distributed in curved shapes, the controller 180 may derive approximate curves rather than approximate straight lines, and set the target path 45 between such approximate curves. The target path 45 may be set in a relatively short range beginning at the position of the work vehicle 100 (e.g., a range on the order of several meters). The target path 45 may be defined by a plurality of waypoints. Each waypoint may include information of the position and orientation (or velocity) of the point to be passed by the work vehicle 100. The interval between waypoints may be set to a value of e.g. several ten centimeters (cm) to several meters (m). The controller 180 causes the work vehicle 100 to travel along the target path 45 that has been set. For example, the controller 180 performs steering control for the work vehicle 100 so as to minimize the deviation of the position and orientation of the work vehicle 100 with respect to the target path 45. As a result, the work vehicle 100 can be made to travel along the target path 45.

The obstacle map 40 shown in FIG. 8 is an occupancy grid map including a plurality of grid cells that are arranged in a two-dimensional array. Although FIG. 8 illustrate 16×16=256 grid cells, the number of grid cells may be arbitrary. Without being limited to the illustrated example, the obstacle map 40 may be a map (e.g., a voxel map) indicating a three-dimensional distribution of geographic features existing around the work vehicle 100, for example. Alternatively, the obstacle map 40 may be a map data of other formats, e.g., a point cloud map.

The controller 180 may generate the obstacle map 40 by eliminating data of any points that are estimated as corresponding to unwanted objects, e.g., the ground surface and weeds, from the sensor data that is output from the LiDAR sensor(s) 140. In a case where three-dimensional point cloud data is output as the sensor data, from the point cloud data, the controller 180 may extract only the data of points whose height from the ground surface is within a predetermined range (e.g., within a range of 0.1 m to 1.5 m), and generate the obstacle map from the extracted data of points. By such a method, an obstacle map indicating a distribution of trees (mainly the trunks) can be generated.

Figure 9A:
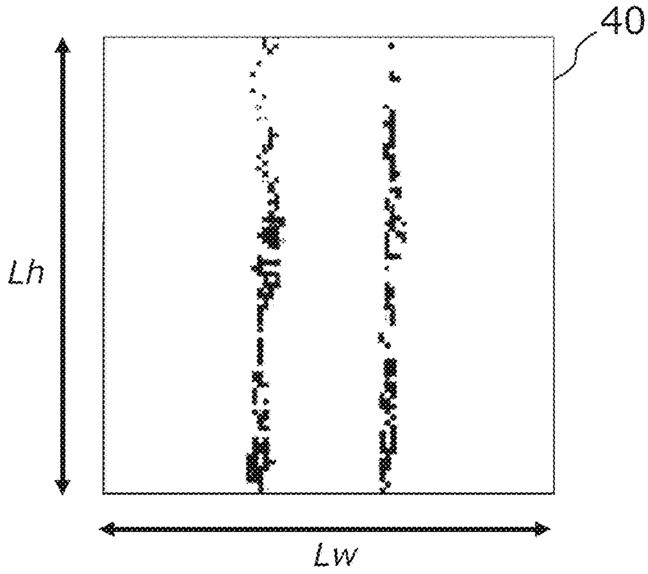
FIG. 9A is a diagram showing an example of an obstacle map.
Figure 9B:
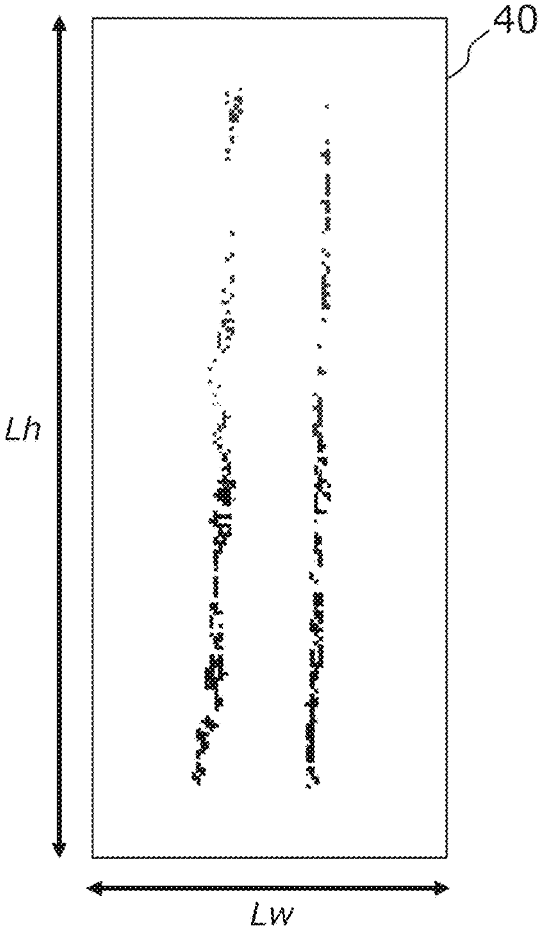
FIG. 9B is a diagram showing another example of an obstacle map.

FIG. 9A is a diagram showing an example of the obstacle map 40 being generated based on sensor data. In the obstacle map 40 shown in FIG. 9A, grid cells in which objects exist are depicted as dark, while grid cells in which no objects exist are depicted as blank. The dark grid cells indicate the presence of objects such as tree trunks or leaves. The obstacle map 40 may be expressed by data in which numerical value "1" is assigned to any grid cell in which an object exists and numerical value "0" is assigned to any grid cell in which no object exists, for example. The controller 180 may be configured so as to consecutively generate the obstacle map 40 as shown in FIG. 9A based on sensor data that is acquired by the LiDAR sensor(s) 140 through one cycle of scanning. For each cycle of scanning, the obstacle map 40 may be updated. The obstacle map 40 may include not only two-dimensional positional information as illustrated, but also information of height from the ground surface or the horizontal plane. The controller 180 may extract only the points whose height is within a predetermined range to generate the obstacle map 40 indicating the distribution of rows of trees. The controller 180 may merge the sensor data that is output from a plurality of LiDAR sensors 140 to generate one obstacle map 40. For example, the sensor data that is output from two LiDAR sensors 140 (see FIG. 1) that are disposed in the front and the rear of the work vehicle 100 may be merged to generate one obstacle map 40. Alternatively, sensor data equivalent to a plurality of cycles may be merged to generate one obstacle map. In the example of FIG. 9A, the length Lh and the width Lw of the obstacle map 40 are equal. However, the length Lh and the width Lw may be different. For instance, as in the example shown in FIG. 9B, the length Lh of the obstacle map 40 may be longer than its width Lw.

Figure 9C:
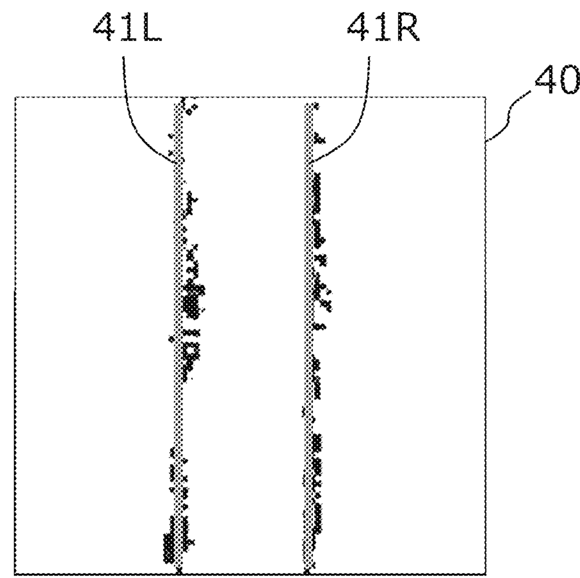
FIG. 9C is a diagram for describing a process of detecting two rows of trees based on an obstacle map.

Based on the obstacle map 40, the controller 180 detects two rows of trees 20R and 20L existing on opposite sides of the work vehicle 100. For example, as shown in FIG. 9C, the controller 180 can detect two rows of trees 20R and 20L by determining two approximate straight lines 41R and 41L (or approximate curves) from a plurality of rows of points that are distributed along the traveling direction of the work vehicle 100.

FIG. 8 is again referred to. During travel in the inter-row travel mode, based on the sensor data, upon detecting an end of at least the row of trees corresponding to the turning direction between the two rows of trees 20R and 20L, the controller 180 performs a process for transitioning to the turning travel mode. In a case where the turning direction is right, for example, after detecting an end of the right row of trees 20R, the controller 180 performs a process for transitioning to the turning travel mode. Specifically, upon detecting an end of the row of trees 20R corresponding to the turning direction, the controller 180 sets a coordinate system for turning travel (turning coordinate system) and a target point for the turning travel. A target point for turning travel is an end point of the turning travel, which may be the start point of a next instance of inter-row travel, for example. Based on the interval between rows of trees 20R and 20L and the position of the end of the row of trees 20R in the turning direction, the controller 180 determines the position coordinates of the target point in the turning coordinate system. After setting the turning coordinate system and the target point, based on the turning coordinate system, the controller 180 causes the work vehicle 100 to turn toward the target point.

Figure 10A:
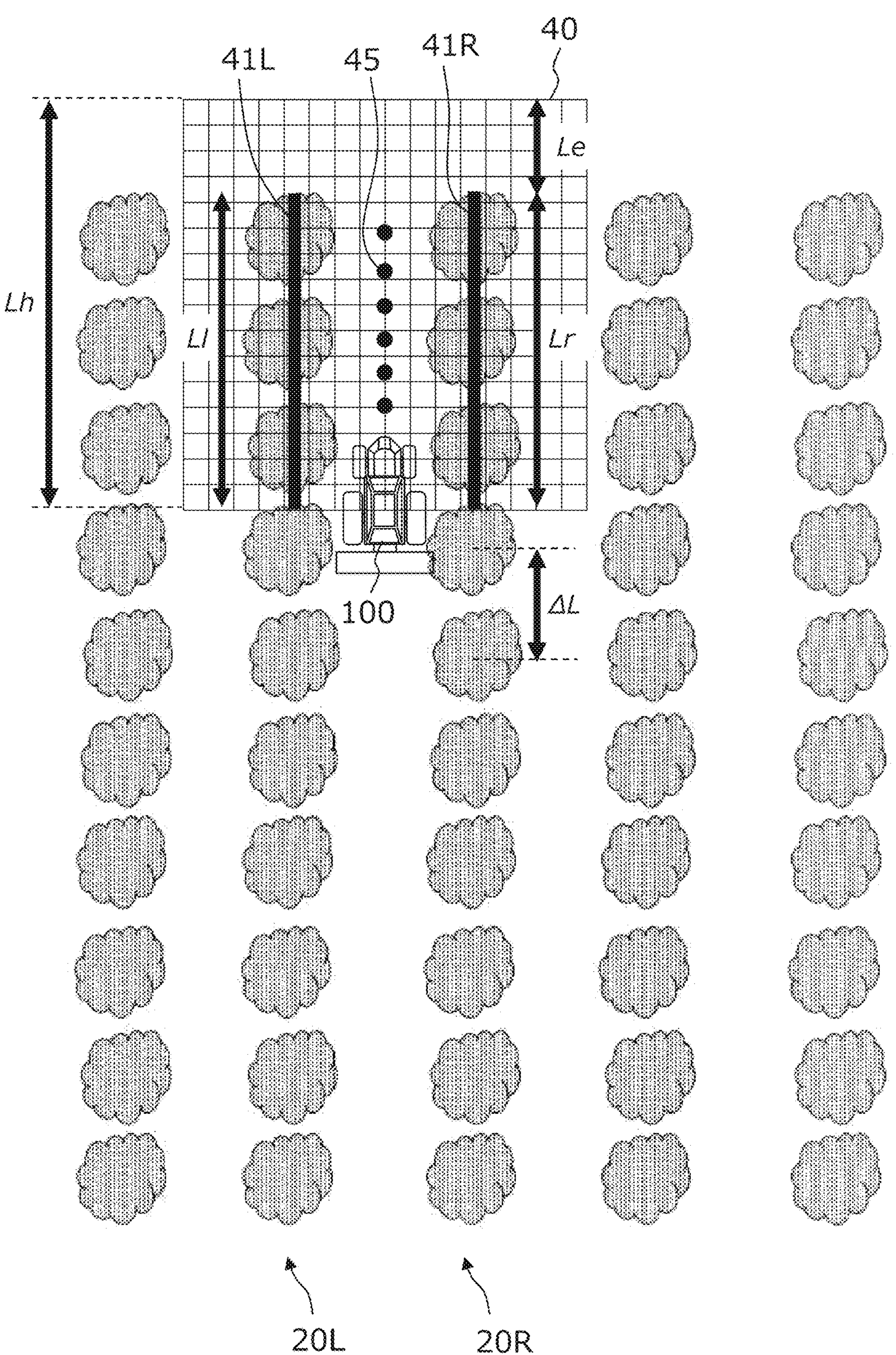
FIG. 10A is a diagram for describing an example of a method of setting a turning coordinate system and a target point.
Figure 10B:
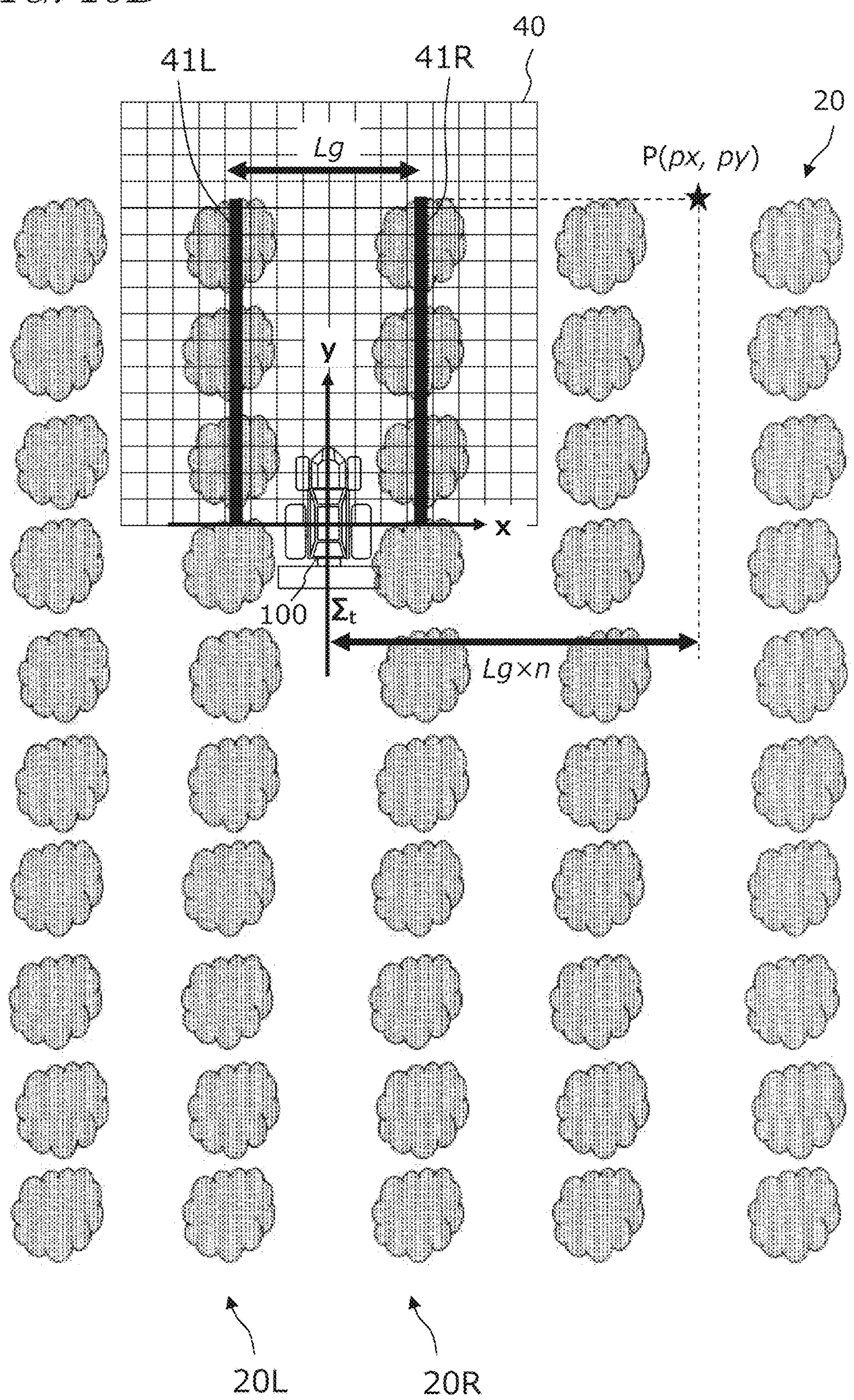
FIG. 10B is a diagram for describing an example of a method of setting a turning coordinate system and a target point.

FIG. 10A and FIG. 10B are diagrams for describing examples of a method of setting the turning coordinate system and the target point. In the example shown in FIG.

10A, the work vehicle 100 travels through a passage between rows of trees 20R and 20L, and then turns right to head toward a passage between next rows of trees. During travel, based on the obstacle map 40, the controller 180 estimates a length Lr of at least the row of trees 20R corresponding to the turning direction in the obstacle map 40, between the two rows of trees 20R and 20L. The controller 180 can estimate the lengths Lr and Ll of the rows of trees 20R and 20L in the obstacle map 40 to be the lengths of the approximate straight lines 41R and 41L of the rows of trees 20R and 20L. Based on a difference Le between the length Lh of the obstacle map 40 and the length Lr of the row of trees 20R in the turning direction in the obstacle map 40, the controller 180 detects the end of the row of trees 20R. For example, when the difference Le between the length Lh of the obstacle map 40 and the length Lr of the row of trees 20R in the obstacle map 40 has exceeded a threshold, the controller 180 can determine that the end of the row of trees 20R has been detected. In other words, as soon as the length Le of the region in which no objects exist ahead of the row of trees 20R has exceeded the threshold in the consecutively-generated obstacle map 40, it is determined that the end of the row of trees 20R has been detected. The threshold may be set to a value that is greater than the interval $\Delta L$ between two adjacent trees in each row of trees 20, for example. The interval $\Delta L$ is pre-designated, and its information is recorded in the storage 170.

After detecting the end of the row of trees 20R in the turning direction, the controller 180 sets the turning coordinate system. First, the controller 180 sets an origin of the turning coordinate system based on the position of the work vehicle 100 at the time of detecting the end of the row of trees 20R in the turning direction. For example, the controller 180 may set the position of the work vehicle 100 at the time of detecting the end of the row of trees 20R as an origin of the turning coordinate system. Alternatively, a position that is shifted in a predetermined direction and by a predetermined distance from the position of the work vehicle 100 at the time of detecting the end of the row of trees 20R may be set as the origin of the turning coordinate system.

FIG. 10B illustrates an example of a turning coordinate system $\Sigma t$ whose origin is the position of the work vehicle 100 at the time of detecting the end of the row of trees 20R. The turning coordinate system $\Sigma t$ in this example is defined by a y axis extending in the traveling direction of the work vehicle 100 from the origin and an x axis extending in a direction that is parallel to the horizontal plane and perpendicular to the y axis. Once setting the turning coordinate system $\Sigma t$, based on the obstacle map 40, the controller 180 estimates an interval (i.e., the interval between the two approximate straight lines 41R and 41L) Lg between the two rows of trees 20R and 20L, and sets an integer multiple (except for 0) of the interval Lg as an x coordinate value px of the target point P. In other words, by performing the computation $px=Lg\times n$ for n as a non-zero integer, the x coordinate value px of the target point P is determined. Note that the interval Lg between rows of trees may be a pre-designated fixed value. In the example of FIG. 10B, n=2, and px=2 Lg. When n=1, the work vehicle 100 turns toward a passage between the next rows of trees. When n=2, the work vehicle 100 turns toward a passage between the second next rows of trees. The integer n can be set based on minimum turning radius of the work vehicle 100 and the interval Lg between rows of trees, for example. If two times the minimum turning radius (diameter) is equal to or less than the interval Lg between rows of trees, n may be set to an integer or 1 or greater. If two times the minimum turning radius is greater than Lg but equal to or less than 2 Lg, n may be set to an integer of 2 or greater. Thus, given the k as an integer that is 1 or greater, if two times the minimum turning radius is greater than $Lg\times(k-1)$ and is equal to or less than $Lg\times k$, n may be set to an integer of k or greater. n may be set to an integer of 3 or greater. Note that when the work vehicle 100 turns left, n may be set to a negative integer. The factor n may be pre-designated by the user, for example.

In the example of FIG. 10B, based on the y coordinate value of the end of the row of trees 20R in the turning coordinate system $\Sigma t$, the controller 180 sets the y coordinate value of the target point P. For example, the controller 180 may set the y coordinate value of the end of the row of trees 20R in the turning coordinate system $\Sigma t$ as the y coordinate value py of the target point P. Alternatively, a value obtained by adding a predetermined amount to or subtracting a predetermined amount from the y coordinate value of the end of the row of trees 20R may be set as the y coordinate value py of the target point P.

Thus, based on the obstacle map 40, the controller 180 sets the turning coordinate system $\Sigma t$, calculates the lengths Lr and Ll of the rows of trees 20R and 20L as well as the interval Lg between rows of trees, and based on these values, determines the target point, which is an entrance of the passage between the rows of trees to be next traveled through.

Figure 11:
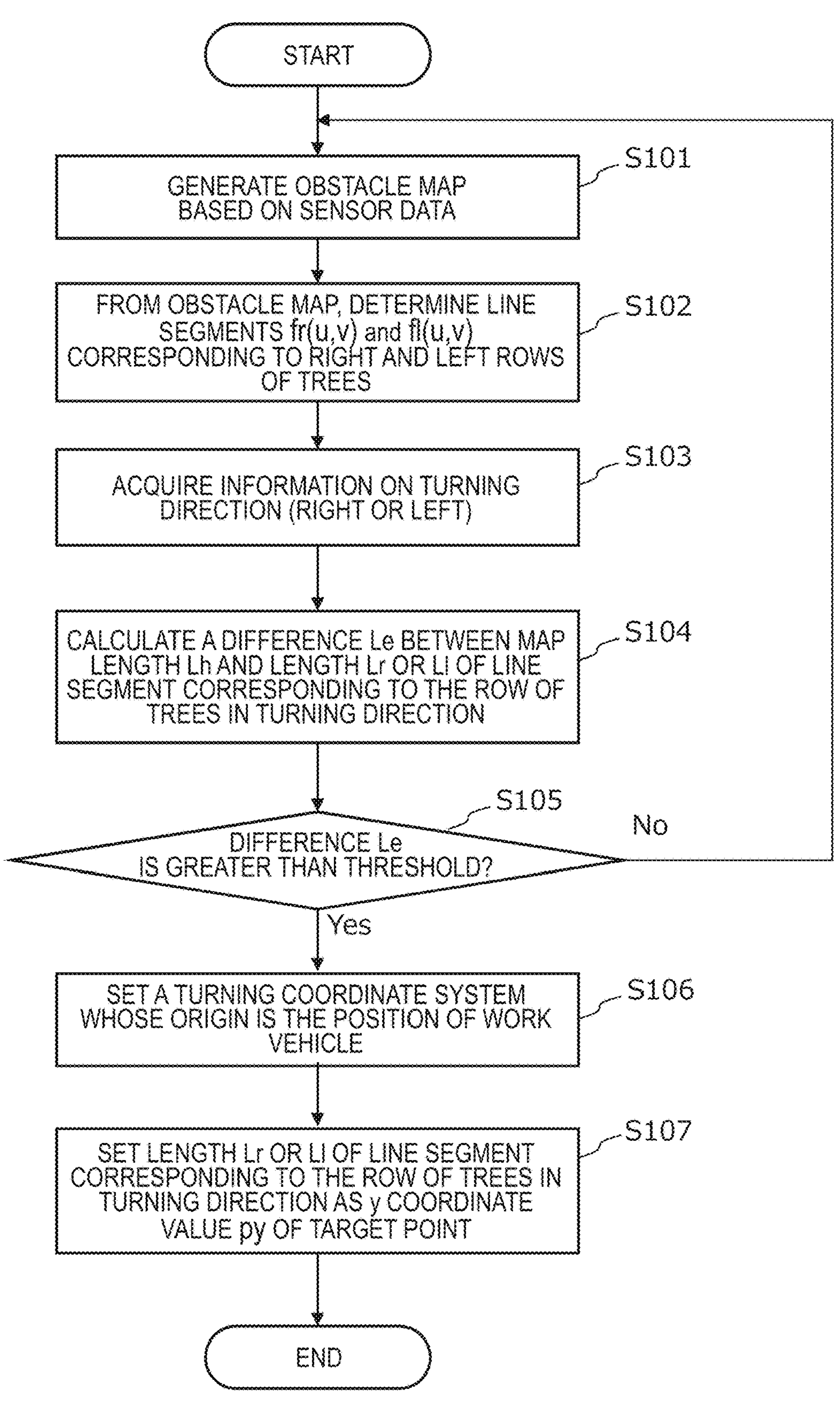
FIG. 11 is a flowchart showing an example process of determining a turning coordinate system and a y coordinate value of a target point.
Figure 12:
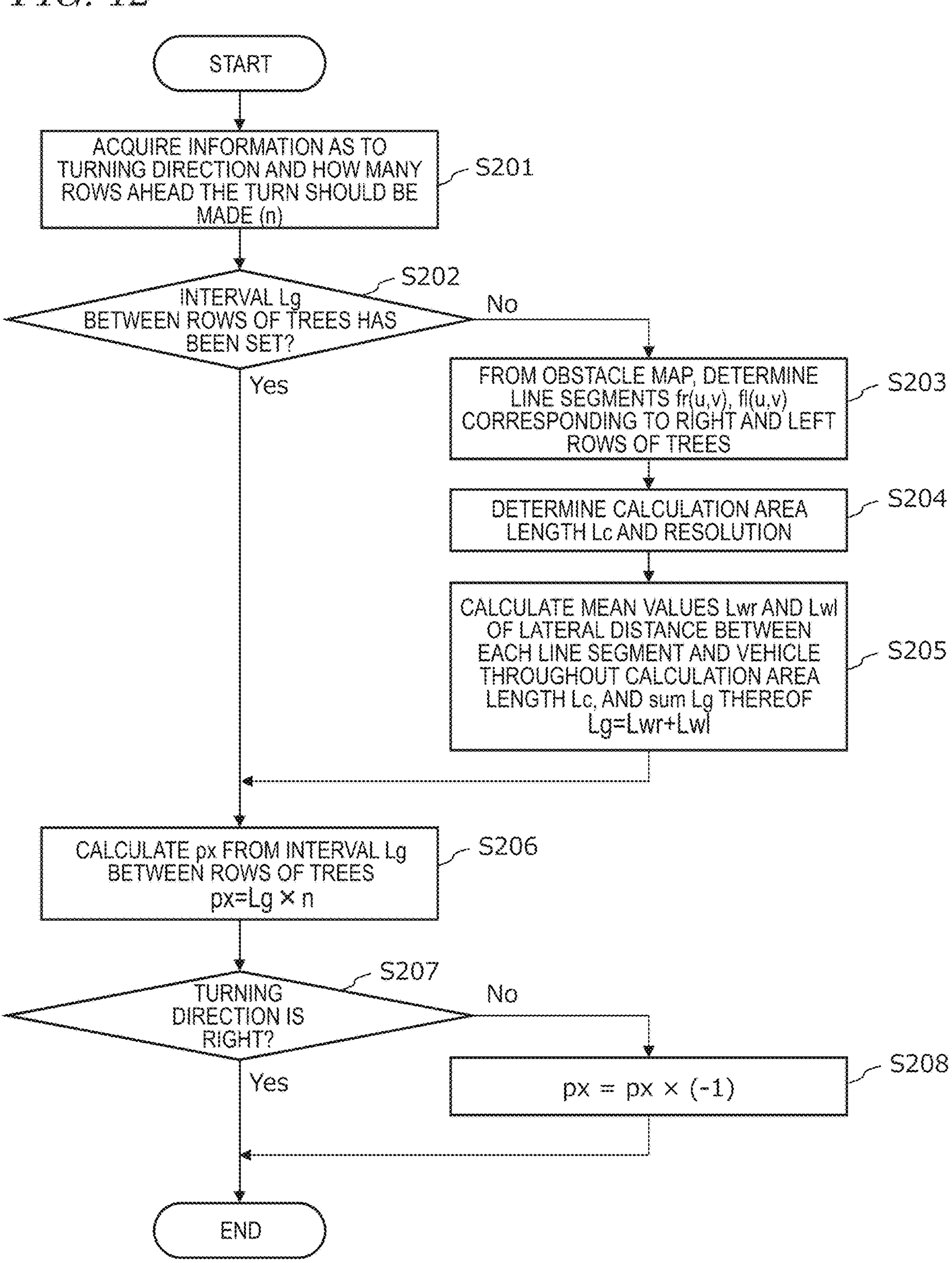
FIG. 12 is a flowchart showing an example process of determining an x coordinate value of a target point.
Figure 13:
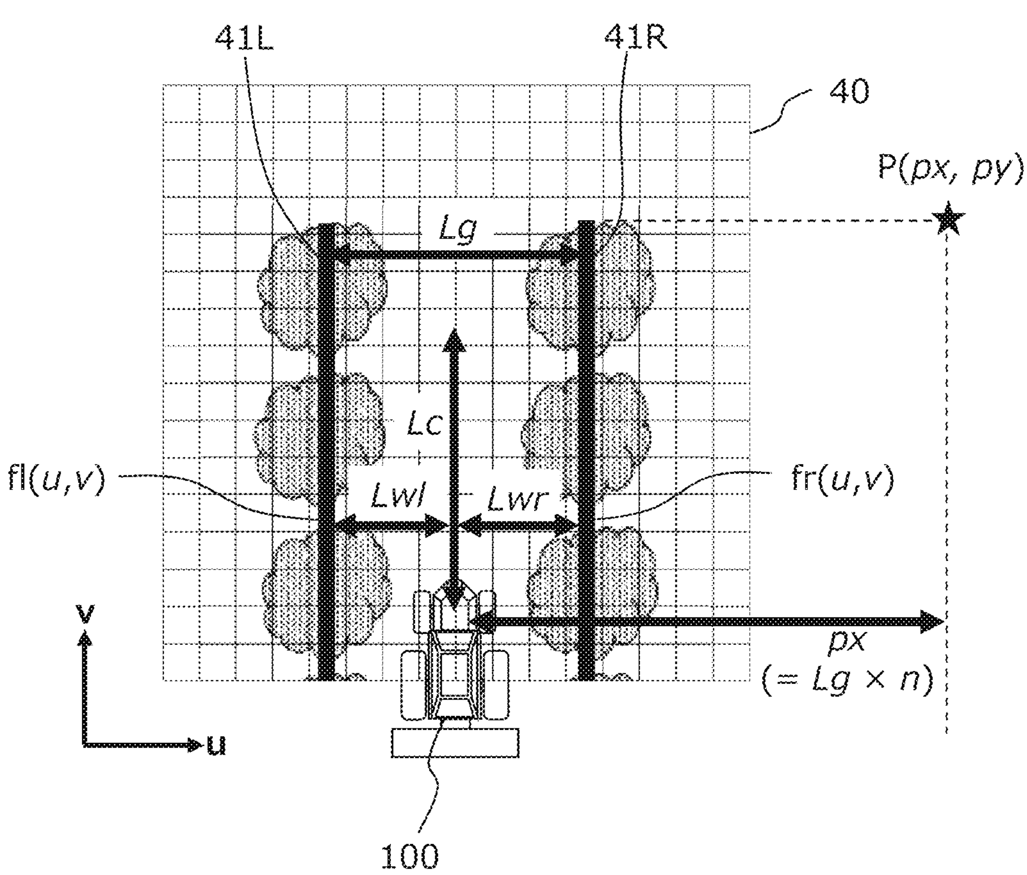
FIG. 13 is a diagram showing example parameters to be used in a process of determining a target point.

Now, with reference to FIG. 11 to FIG. 13, the process of determining the turning coordinate system and the position of the target point P will be described more specifically. FIG. 11 is a flowchart showing an example process of determining the turning coordinate system and the y coordinate value py of the target point P. FIG. 12 is a flowchart showing an example process of determining the x coordinate value px of the target point P. FIG. 13 is a diagram showing example parameters to be used in the process of determining the target point P.

In the example of FIG. 11, at step S101, first, the controller 180 generates an obstacle map 40 based on sensor data. As mentioned above, the controller 180 generates the obstacle map 40 by extracting a predetermined spatial range from the sensor data. At the next step S102, by performing a process such as a Hough transform for the obstacle map 40, the controller 180 determines line segments fr(u,v) and fl(u,v) corresponding to the rows of trees to the right and left of the work vehicle 100, as shown in FIG. 13. Here, (u,v) represents coordinates in the vehicle coordinate system. At the next step S103, the controller 180 acquires information concerning the turning direction (right or left). The turning direction (right or left) is pre-designated, and its information is stored in the storage 170.

At step S104, the controller 180 calculates a difference Le between the length Lh of the obstacle map 40 and the length Lr or Ll of the line segment corresponding to the row of trees in the turning direction (see FIG. 10A). At the next step S105, the controller 180 determines whether the difference Le is greater than a threshold or not. If the difference Le is equal to or less than the threshold, control returns to step S101. If the difference Le is greater than the threshold, control proceeds to step S106.

At step S106, the controller 180 sets a turning coordinate system $\Sigma t$ whose origin is the position of the work vehicle 100 at that moment. At the next step S107, the controller 180 sets the length Lr or Ll of the line segment corresponding to the row of trees in the turning direction as the y coordinate value py of the target point P. In the obstacle map 40, if the position of the work vehicle 100 is deviated from the lower end of the center of the obstacle map 40, such deviation is factored into the setting of py. In either case, a value which is equal to or greater than the y coordinate value of the end of the row of trees in the turning direction may be set as the y coordinate value of the target point P.

Through the above operation, the turning coordinate system and the y coordinate value py of the target point P are determined.

Next, with reference to FIG. 12, a specific example of a method of determining the x coordinate value px of the target point P will be described. The operation shown in FIG. 12 may be performed either before or after the operation shown in FIG. 11.

In the example of FIG. 12, at step S201, first, the controller 180 acquires information as to the turning direction (right or left) and how many rows ahead the turn should be made (the aforementioned factor n). The turning direction (right or left) and how many rows ahead the turn should be made are pre-designated, and this information is stored in the storage 170.

At the next step S202, the controller 180 determines whether the interval Lg between rows of trees has already been set or not. If the interval Lg between rows of trees is pre-designated, control proceeds to step S206. If the interval Lg between rows of trees has not been set, control proceeds to step S203.

At step S203, from the obstacle map 40, the controller 180 determines line segments fr(u,v) and fl(u,v) corresponding to the right and left rows of trees. If the line segments fr(u,v) and fl(u,v) have already been determined at step S102 shown in FIG. 11, step S203 may be omitted.

At the next step S204, the controller 180 determines a calculation area length Lc and a resolution of calculation. The calculation area length Lc is a numerical value indicating the length of the range, from the current position of the work vehicle 100 in the traveling direction, is to be subjected to calculation. The resolution is a numerical value indicating the spatial resolution with which the calculation should be carried out across the calculation area length. The calculation area length Lc and the resolution may be pre-designated fixed values, or set by the user.

At step S205, the controller 180 averages the distance (referred to as the "lateral distance") between each of the line segments fr(u,v) and fl(u,v) and the reference position of the work vehicle 100 throughout the calculation area length Lc, thereby calculating mean values Lwr and Lwl. Furthermore, the controller 180 calculates a sum Lg of Lwr and Lwl, and adopts this as the interval between rows of trees.

At step S206, the controller 180 multiplies the interval Lg between rows of trees with the factor n, thus calculating the x coordinate value px of the target point P. In other words, it performs a calculation px=Lg×n to determine px.

At the next step S207, the controller 180 determines whether the turning direction is right or left. If the turning direction is right, the px as calculated at step S206 is adopted as the x coordinate value of the target point P. If the turning direction is left, control proceeds to step S208, and a value obtained by multiplying px with −1 is adopted as the x coordinate value of the target point P.

Through the above operation, the x coordinate value px of the target point P can be determined.

After setting the turning coordinate system Σt and the target point P of turn in the inter-row travel mode, the controller 180 switches to the turning travel mode. After setting the coordinate system Σt and the target point P, the controller 180 determines whether turning is possible or not, based on the sensor data that is output from the LiDAR sensor(s) 140. If determining that turning is possible, the controller 180 switches to the turning travel mode. For example, after setting the coordinate system Σt and the target point P in the inter-row travel mode, upon determining based on the sensor data that a space needed for turning exists and the work vehicle 100 (if the implement 300 is attached, including also the implement 300) has passed the end of the row of trees 20R in the turning direction, the controller 180 switches to the turning travel mode.

Figure 14:
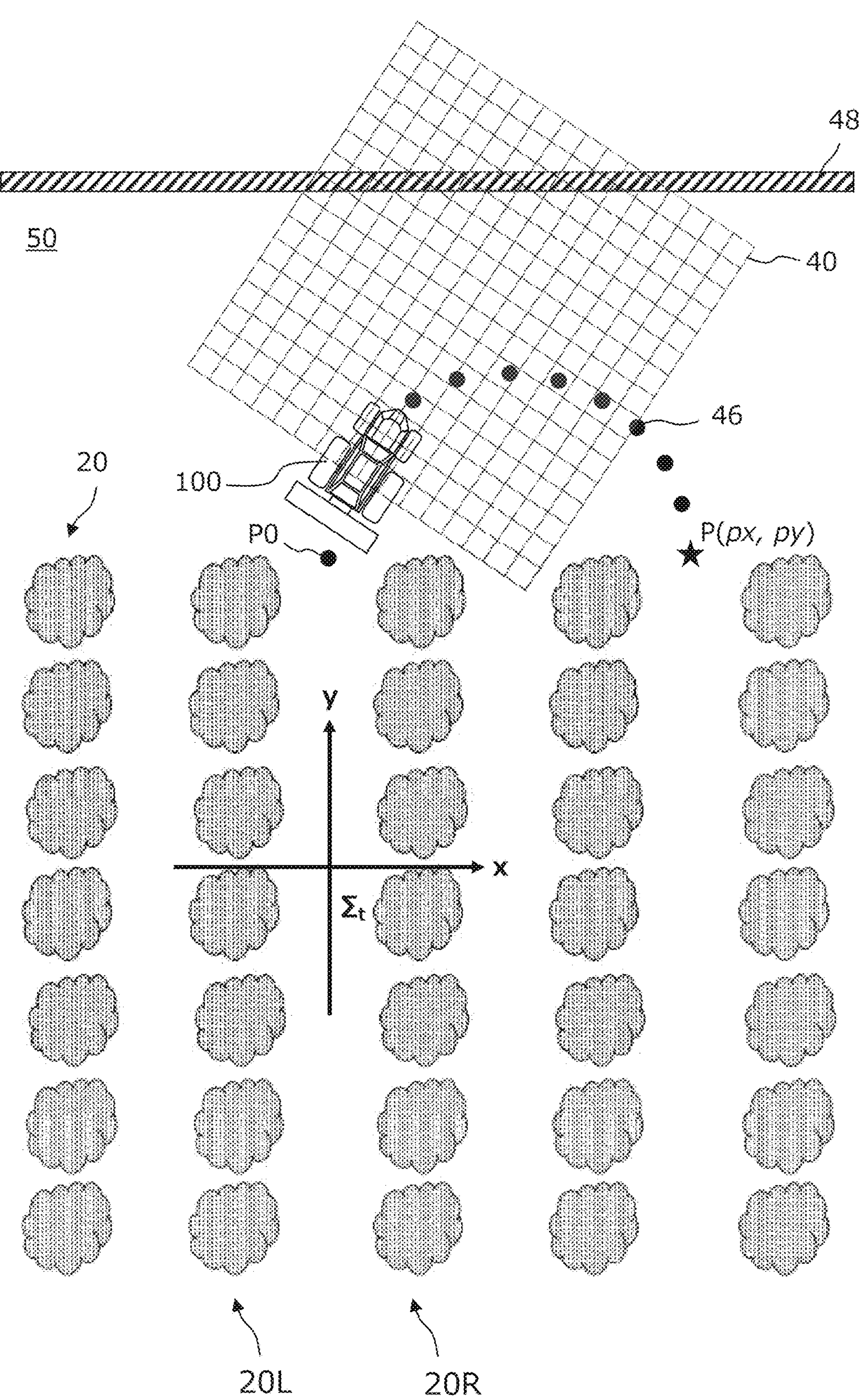
FIG. 14 is a diagram for describing an operation of the work vehicle in a turning travel mode.

FIG. 14 is a diagram for describing an operation of the work vehicle 100 in the turning travel mode. In the turning travel mode, the controller 180 sets a turning path 46 on the turning coordinate system Σt, and causes the work vehicle 100 to travel along the turning path 46 while performing localization on the coordinate system Σt based on the sensor data being consecutively output from the LiDAR sensor(s) 140. For example, the controller 180 sets as the turning path 46 an arc-shaped path that connects a point P0 at which the work vehicle 100 goes past the end of the row of trees 20R in the turning direction and the target point P of turn. The turning path 46 is defined by a plurality of waypoints. Each waypoint main include information of a position and an orientation.

In the example of FIG. 14, the space of a headland 50 between the end of each row of trees and the boundary 48 of the orchard is sufficiently broad to allow for turning. In such a case, while performing localization for the work vehicle 100 based on the sensor data, the controller 180 causes the work vehicle 100 to travel along the turning path 46. The localization may employ an algorithm such as SLAM. The controller 180 may generate an environment map with a relatively broad range by joining together consecutively generated obstacle maps 40, and perform matching against the environment map and the sensor data, thus achieving localization (i.e., estimation of position and orientation) for the work vehicle 100. The matching may be carried out by using any arbitrary matching algorithm such as NDT (Normal Distribution Transform) or ICP (Iterative Closest Point), for example. The controller 180 performs control so as to reduce the deviation between the position and orientation of the work vehicle 100 and the position and orientation of each waypoint in the turning path 46. As a result of this, the work vehicle 100 turns toward the target point P along the turning path 46. On the other hand, if there is no sufficient space for turning in the headland 50, the controller 180 may halt the work vehicle 100, or send an alert to the terminal device 400 for monitoring purposes.

Next, with reference to FIG. 15, the method of travel control for the work vehicle 100 according to the present example embodiment will be described in more detail.

Figure 15:
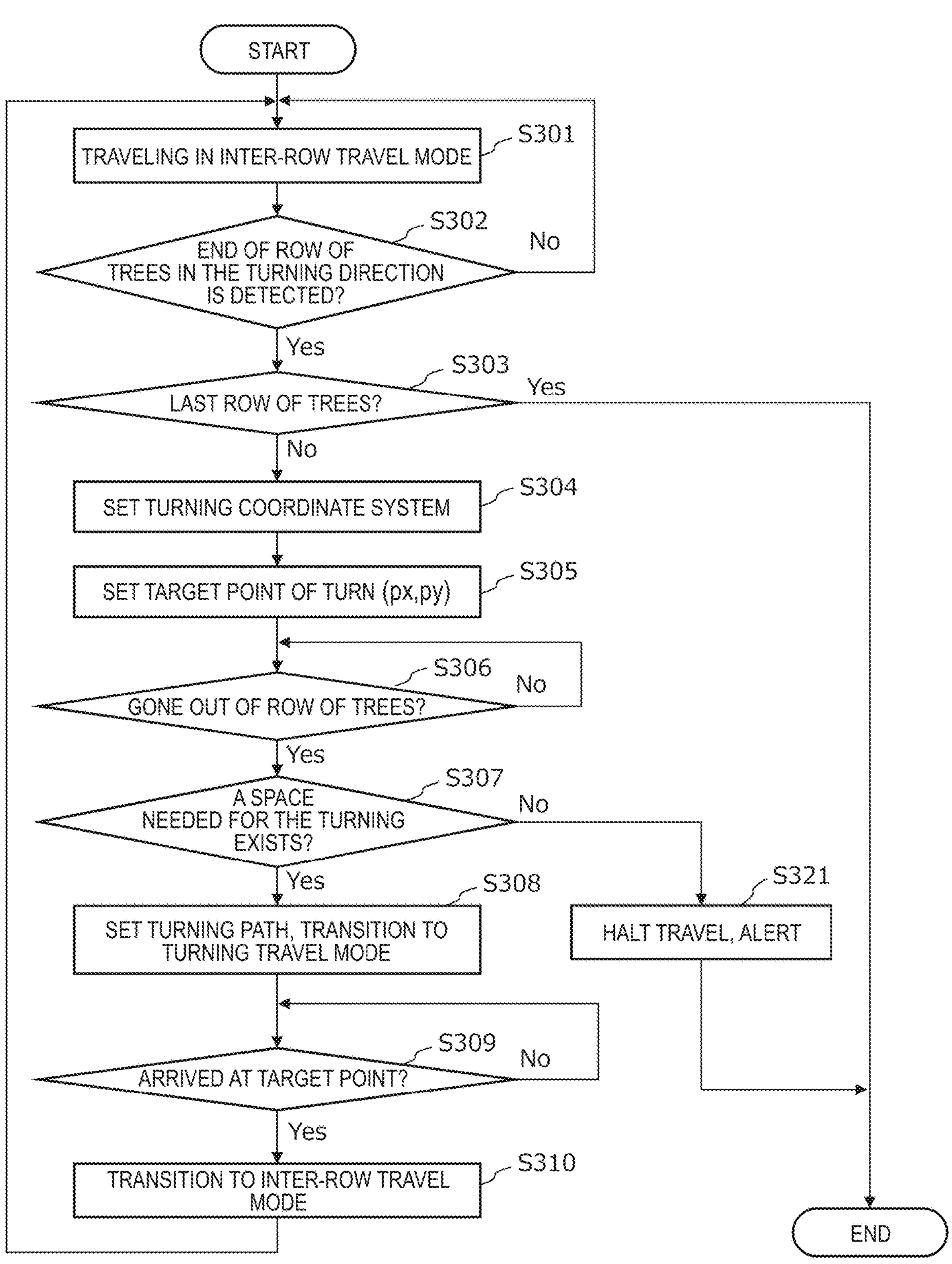
FIG. 15 is a flowchart showing a specific example of a method of travel control by a controller.

FIG. 15 is a flowchart showing a specific example of a method of travel control by the controller 180. By carrying out the operation from steps S301 to S321 shown in FIG. 15, the controller 180 can cause the work vehicle 100 to perform self-traveling between rows of trees. Hereinafter, the operation of each step will be described.

In an initial state, it is assumed that the work vehicle 100 is located at the entrance of a passage between the first rows of trees, as shown in FIG. 7A or FIG. 7B. Upon receiving command to start self-traveling, the controller 180 begins the operation of step S301.

At step S301, the controller 180 causes the work vehicle 100 to travel in the inter-row travel mode. In the inter-row travel mode, the controller 180 performs the following operation. First, based on the sensor data that is output from the LiDAR sensor(s) 140, the controller 180 generates the obstacle map 40. Next, from the obstacle map 40, approximate straight lines of two adjacent rows of trees that are located on opposite sides of the work vehicle 100 are calculated. The approximate straight lines can be calculated by performing a Hough transform for the obstacle map 40 in order to extract two line segments extending in directions close to the traveling direction in the vicinity of the work vehicle 100, for example. The controller 180 sets a target path by setting a plurality of waypoints at positions that are equidistant from the two approximate straight lines. In a case where the positions to be worked on by the implement 300 attached to the work vehicle 100 are located closer to either one of the right or left, a target path may be set at a position that is shifted from a position that is equidistant from the two approximate straight lines. In a case where the position and orientation of the work vehicle 100 are deviated from the position and direction of the target path, the controller 180 performs steering control so as to reduce the deviation. This allows the work vehicle 100 to travel along a target path that is between the rows of trees. If during travel an obstacle is detected on or near the target path, the controller 180 may halt the work vehicle 100, or change the target path in the middle so as to avoid the obstacle. At this time, the controller 180 may send an alert to the terminal device 400 for monitoring purposes.

At step S302, based on the obstacle map 40, the controller 180 performs a process of detecting an end of a row of trees. First, the controller 180 determines the lengths Lr and Ll (see FIG. 10A) of the two approximate straight lines as extracted by performing a Hough transform for the obstacle map 40. Next, the controller 180 determines whether a difference Le between the length Lh of the obstacle map 40 and the length Lr or Ll of the approximate straight line corresponding to the turning direction between the two approximate straight lines exceeds a pre-designated threshold or not. If the difference Le exceeds the threshold, it is determined that the end of a row of trees has been detected. Until the end of a row of trees is detected, the operation of steps S301 and S302 is repeated. Once the end of the row of trees is detected, control proceeds to step S303.

At step S303, the controller 180 determines whether the row of trees whose end has been detected is the last row of trees or not. The determination as to whether the row of trees is the last row of trees or not can be made based on information concerning the distribution of the row of trees or the number of rows that is stored in the storage 170 in advance. If the row of trees whose end has been detected is the last row of trees, the controller 180 ends the tasked travel of the work vehicle 100. If the row of trees whose end has been detected is not the last row of trees, control proceeds to step S304.

At step S304, the controller 180 sets the turning coordinate system Σt. As has been described with reference to FIG. 10B and FIG. 11, as the turning coordinate system Σt, a coordinate system is set which is defined by an x axis that is perpendicular to the traveling direction of the work vehicle 100 and a y axis that is parallel to traveling direction, from an origin at the position of the work vehicle 100 at the time of detecting the end of the row of trees in the turning direction.

At step S305, the controller 180 sets coordinates (px,py) of the target point P of turn in the turning coordinate system Σt. As shown in FIG. 10B, the x coordinate value px of the target point P can be set to a value obtained by multiplying the interval Lg between rows of trees with the integer n. The y coordinate value py of the target point P can be set to the y coordinate value of the end of the row of trees in the turning direction or a greater value.

Figure 16:
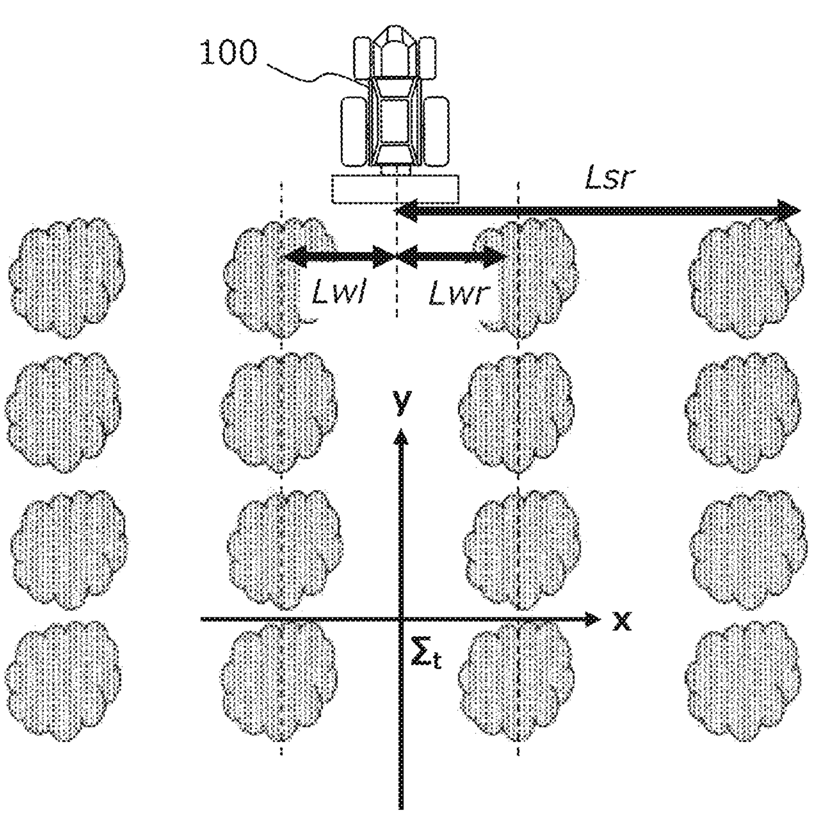
FIG. 16 is a diagram showing an example situation where the work vehicle has gone out of a row of trees.

At step S306, the controller 180 determines whether the work vehicle 100 has gone out of the row of trees in the turning direction. With reference to FIG. 16, an example of this determination process will be described. FIG. 16 shows an example situation where the work vehicle 100 has gone out of the row of trees. Based on the sensor data (or the obstacle map), the controller 180 determines a distance Lsr from the rear end of the work vehicle 100 (or if the implement 300 is attached, the rear end of the implement 300) to an object that exists immediately adjacent in the turning direction (i.e., right in the example shown). The controller 180 can determine that the work vehicle 100 has gone out of the row of trees in the turning direction if a difference (Lsr−Lwr) between Lsr and the distance Lwr to the row of trees in the turning direction has remained above a threshold across a predetermined distance or longer. Alternatively, in the obstacle map 40, if the v coordinate value (see FIG. 13) of the rear end of the work vehicle 100 has become greater than the v coordinate value of the leading end of the row of trees in the turning direction, the controller 180 may determine that the work vehicle 100 has gone out of the row of trees in the turning direction. Until going out of the row of trees in the turning direction, the work vehicle 100 continues to travel between rows of trees, while the determination of step S306 is repeated. Once it is determined that the work vehicle 100 has gone out of the row of trees in the turning direction, control proceeds to step S307.

At step S307, the controller 180 determines whether a space needed for the turning exists or not. This determination may be made based on the obstacle map 40. As shown in FIG. 14, if the headland 50 between the boundary 48 of the field and the row of trees is wide enough so that turning is possible, and there is no obstacle that obstructs turning, it is determined that a space needed for the turning exists. The position (e.g., latitude and longitude) of the boundary 48 of the field may be set by the user in advance, for example, and recorded in the storage 170. The controller 180 determines a region needed for turning based on the position of the target point P, the position of the start point of turn P0, and the sizes of the work vehicle 100 and the implement 300, for example. If the region does not extend beyond the boundary 48 and no obstacle is detected in the region, the controller 180 can determine that a space needed for the turning exists. If a space needed for the turning does not exist, control proceeds to step S321, and the controller 180 halts the work vehicle 100. At this point, an alert signal may be transmitted to an external device, such as the terminal device 400 for monitoring purposes. If a space needed for the turning exists, control proceeds to step S308.

At step S308, the controller 180 sets the turning path 46, and transitions from the inter-row travel mode to the turning travel mode. The turning path 46 may be an arc-shaped path connecting the point P0 and the point P as shown in FIG. 14, or may be a path having any other trajectory. The controller 180 performs steering control for the work vehicle 100 so that the work vehicle 100 travels along the turning path 46. For example, based on the sensor data and the already generated obstacle map, the controller 180 may control turning while estimating the position and orientation of the work vehicle 100 in the turning coordinate system Et. For the estimation of the position and orientation of the work vehicle 100, a signal that is output from the GNSS receiver 111 and/or a signal that is output from the IMU 115 may be utilized. Since it is possible that a person or another vehicle or the like may pass in the headland 50, in order to avoid contact, the controller 180 may keep the traveling speed of the work vehicle 100 during turning lower than the traveling speed during inter-row travel. If an obstacle is detected during turning, the controller 180 may halt the work vehicle 100, or change the turning path 46 in the middle so as to avoid the obstacle.

At step S309, the controller 180 determines whether the work vehicle 100 has arrived at the target point P or not. If the work vehicle 100 has not arrived at the target point, turning travel is continued. If the work vehicle 100 has arrived at the target point, control proceeds to step S310, and the controller 180 transitions to the inter-row travel mode. Thereafter, control returns to step S301, and a similar operation is repeated.

Through the above operation, the work vehicle 100 can automatically perform travel between rows of trees and turns. According to the present example embodiment, when the end of a row of trees is detected, the turning coordinate system and the target point are set, and travel control along the turning path is performed based on a turning coordinate system. This makes it possible to smoothly perform a turn for changing the row to be traveled. Even in an environment in which GNSS-based positioning is difficult, e.g., an orchard or a forest, or in an environment where localization based on a matching between the sensor data and a previously generated environment map is difficult, it becomes possible to smoothly perform self-traveling between rows of trees.

In the example shown in FIG. 15, when a target point of turn is set at step S305, the target point is maintained until the turn is completed. Such an operation is effective in cases where the position of the end of every row of trees is aligned along the y direction, as shown in FIG. 14. However, when the position of the end of every row of trees is not aligned along the y direction, it may become necessary to modify the target point after it is set. For example, if any other row of trees exists on or near a turning path toward the target point P, the work vehicle 100 or the implement 300 may come in contact with this other row of trees unless the target point P is changed. In order to address such situations, after setting the target point P, the controller 180 may perform a process of modifying the target point P based on the sensor data as necessary.

Figure 17A:
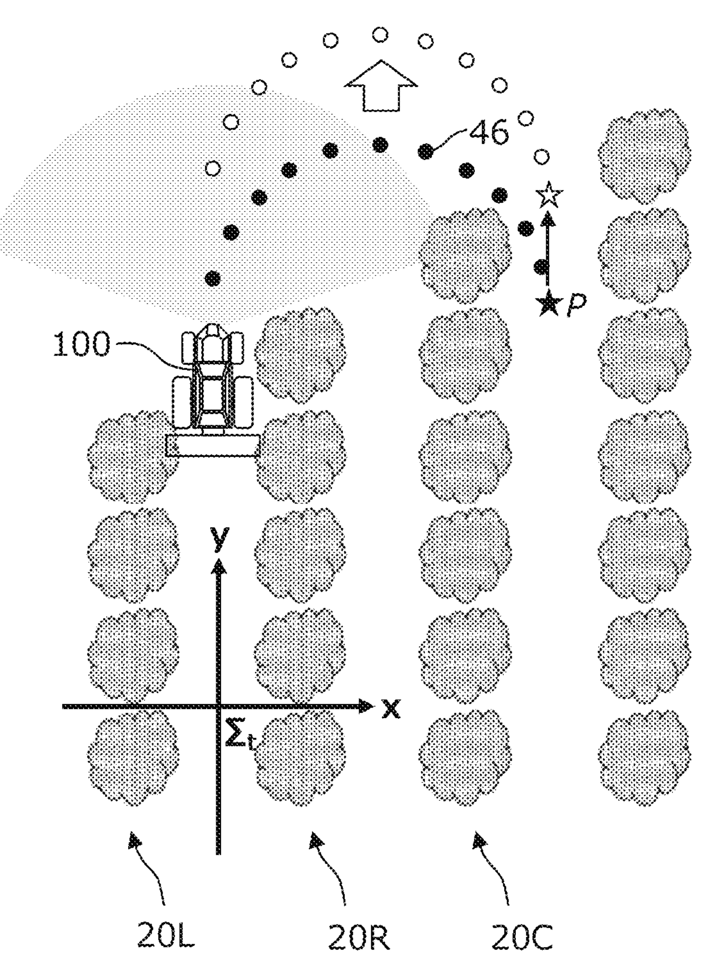
FIG. 17A is a diagram showing an example of an operation of modifying the target point.

FIG. 17A is a diagram showing an example of an operation of modifying the target point P. In the figure, an example of the sensing range of the LiDAR sensor(s) 140 is schematically depicted by a fan shape. In this example, the more to the right the row of trees is located, the longer region along the y direction the trees span. Therefore, after the target point P is set and before the work vehicle 100 has gone past the end of the row of trees 20R, an end of another row of trees 20C that is located to the right of the row of trees 20R is detected. In such a case, the controller 180 modifies the y coordinate value of the target point P to a value that is equal to or greater than the y coordinate value of the end of the other row of trees 20C. With this, the controller 180 modifies the turning path from a path indicated by dark circles in the figure to a path indicated by blank circles. As a result, contact between the work vehicle 100 or the implement 300 and the other row of trees 20C can be avoided.

Figure 17B:
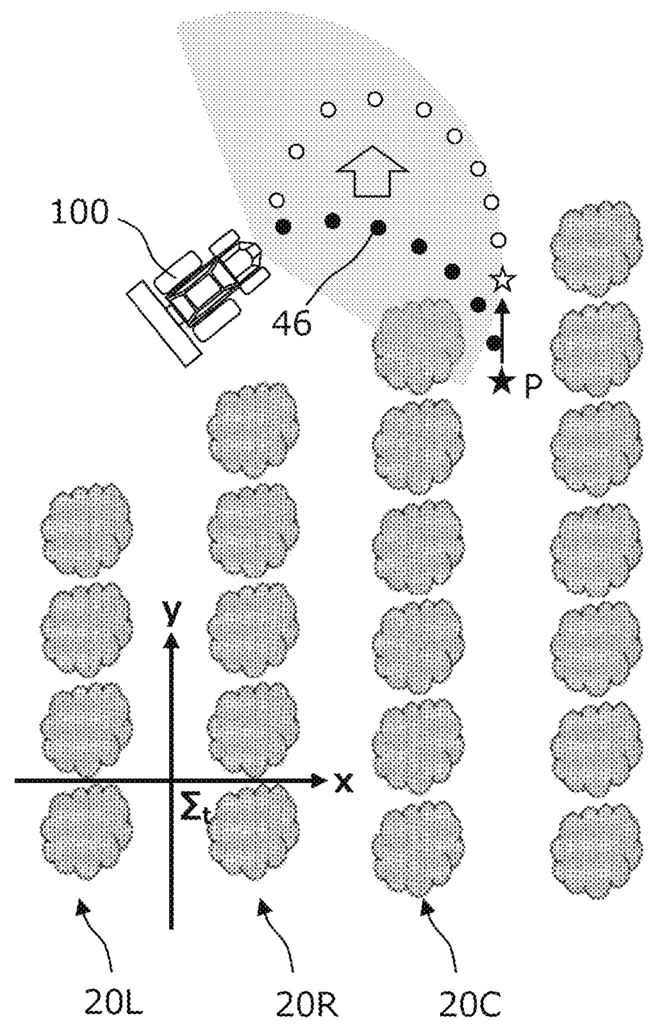
FIG. 17B is a diagram showing another example of an operation of modifying the target point.

FIG. 17B is a diagram showing another example of an operation of modifying the target point P. In this example, after the target point P is set and the work vehicle 100 begins turning beyond the end of the row of trees 20R, another row of trees 20C that is located to the right of the row of trees 20R is detected. In this case, in the middle of the turning, the controller 180 modifies the y coordinate value of the target point P to a value that is equal to or greater than the y coordinate value of the end of the other row of trees 20C. With this, the controller 180 modifies the turning path 46 from a path indicated by dark circles in the figure to a path indicated by blank circles. As a result, contact between the work vehicle 100 or the implement 300 and the other row of trees 20C can be avoided.

In performing the operations illustrated in FIG. 17A and FIG. 17B, after setting the turning coordinate system Σt, the controller 180 may magnify the size of the obstacle map 40. By magnifying the size of the obstacle map 40, it becomes easier to detect an obstacle such as the other row of trees 20C.

Figure 18A:
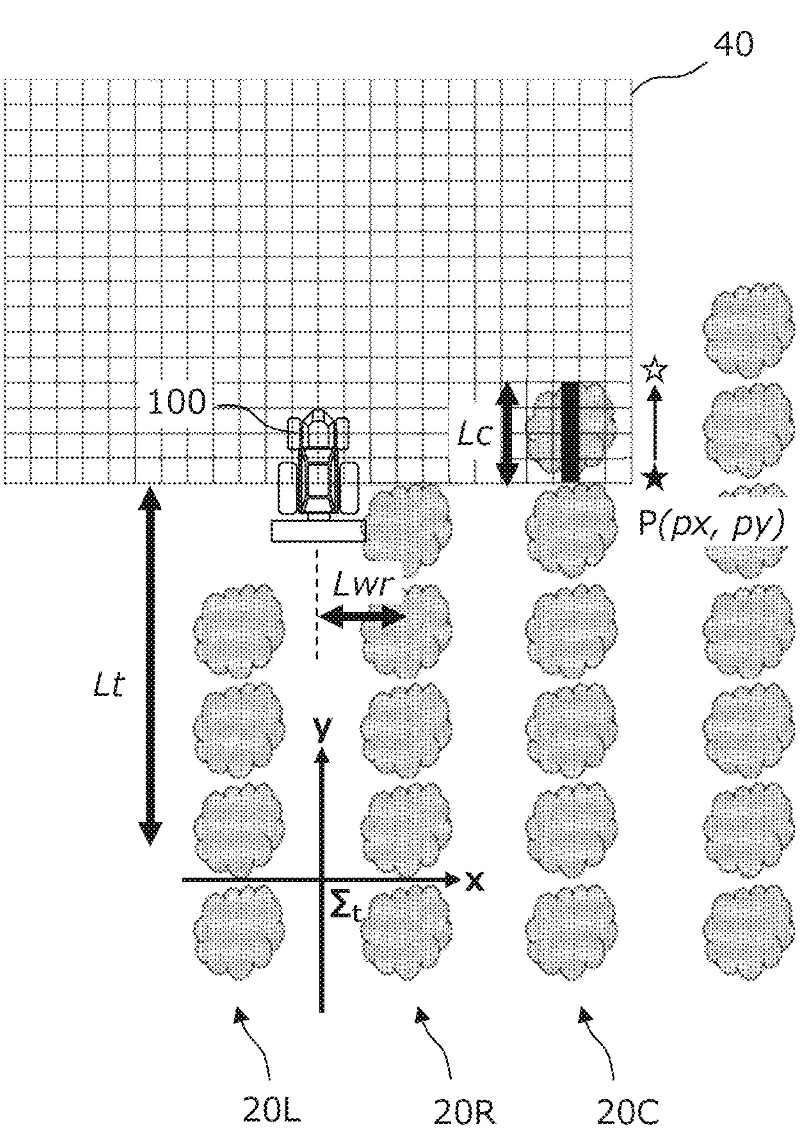
FIG. 18A is a diagram for describing an example of an operation of modifying the target point by using a magnified obstacle map.

FIG. 18A is a diagram for describing an example of an operation of modifying the target point P by using the magnified obstacle map 40. In this example, the lateral size of the obstacle map 40 is magnified to 1.5 times the size in the aforementioned example. Not only the lateral size, but also the longitudinal size may be magnified. Without being limited to 1.5 times, the rate of magnification may be 2 times or greater, for example. The controller 180 detects objects existing within the range of the obstacle map 40 as obstacles. By magnifying the size of the obstacle map 40, the spatial range of any object to be detected as an obstacle is magnified.

In the example of FIG. 18A, before going past the end of the closest row of trees 20R in the turning direction (i.e., right), the work vehicle 100 detects another row of trees 20C that is located to its right, based on the obstacle map 40. By subjecting the obstacle map 40 to a Hough transform or other processes, the controller 180 extracts a line segment corresponding to the row of trees 20C. Let the length of this line segment be Lc. Upon detecting a line segment at a position that is farther away from the distance Lwr to the closest row of trees 20R to the work vehicle 100 in the turning direction from the position of the work vehicle 100, this line segment being essentially parallel to the y axis and having a length that exceeds a predetermined length, the controller 180 updates the y coordinate value py of the target point P. Specifically, as the y coordinate value of the target point P, the controller 180 adopts a value obtained by adding the length Lc of the detected line segment to a distance of move Lt of the work vehicle 100 from the origin of the turning coordinate system Σt. As a result, the target point P is appropriately modified.

Figure 18B:
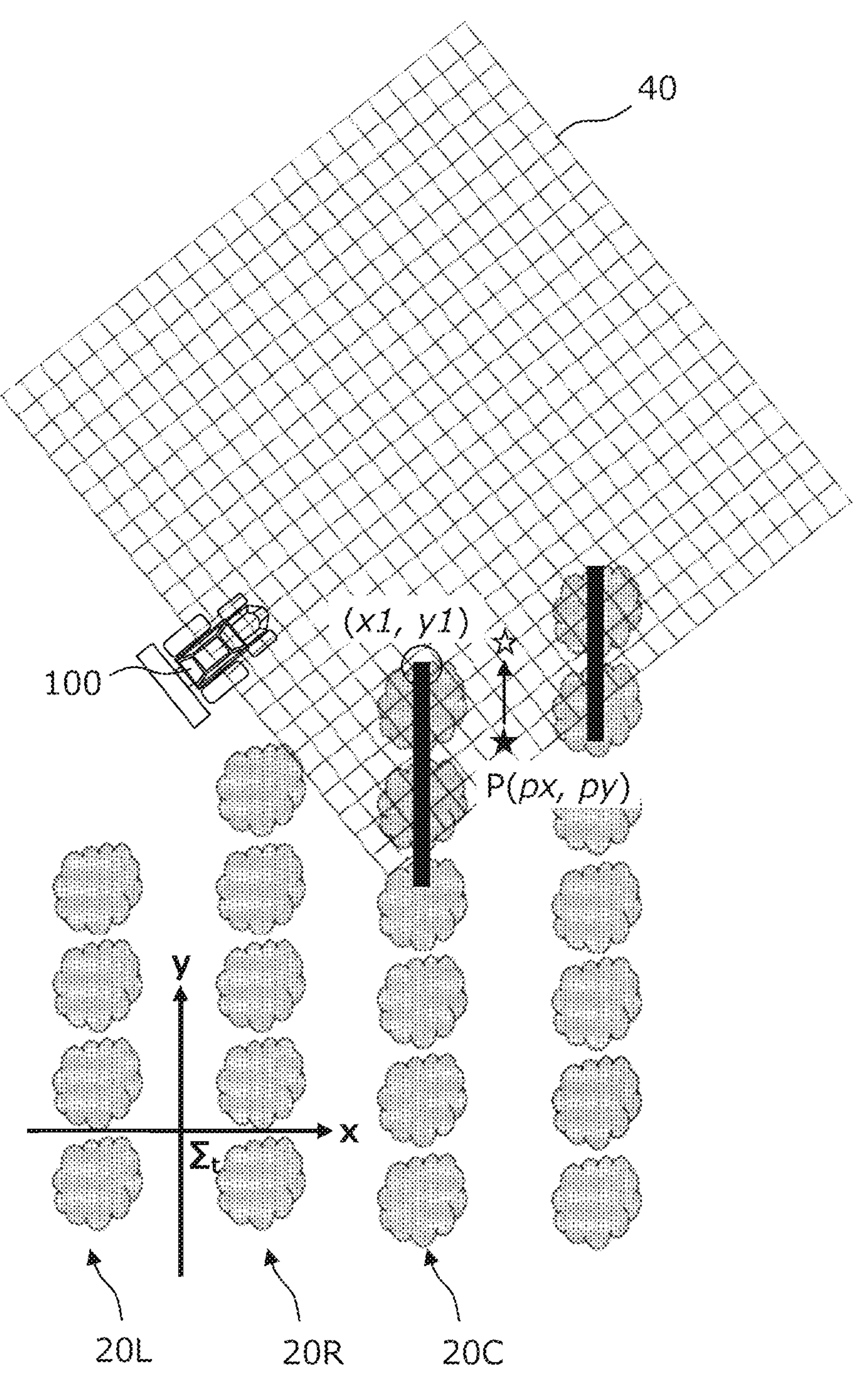
FIG. 18B is a diagram showing another example of an operation of modifying the target point.

FIG. 18B is a diagram for describing another example of an operation of modifying the target point. In this example, when detecting another row of trees 20C during turning travel, the work vehicle 100 modifies the target point P. During turning travel, upon detecting in the obstacle map 40 a line segment at a position whose x coordinate value in the turning coordinate system Et is smaller than the x coordinate value px of the target point P, this line segment having a length that exceeds a predetermined length, the controller 180 updates the y coordinate value py of the target point P. Specifically, the controller 180 converts the position coordinates (u1,v1) of the end of the line segment in the obstacle map 40 being expressed by the vehicle coordinate system into position coordinates (x1,y1) in the turning coordinate system Et. The controller 180 modifies the y coordinate value py of the target point P into a value that is equal to greater than the y coordinate value y1 of the end of the row of trees 20C. As a result, the target point P is appropriately modified.

Figure 19:
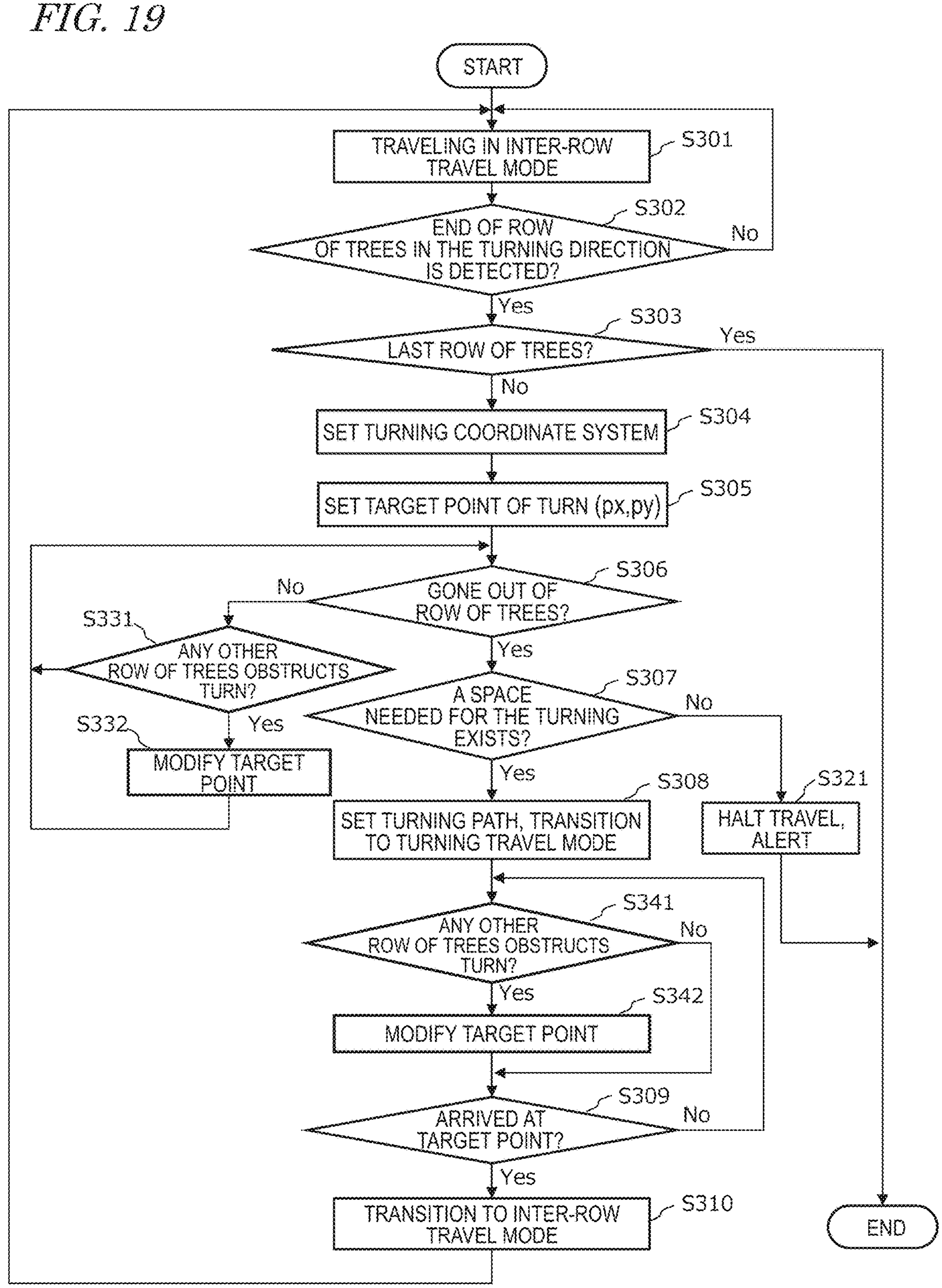
FIG. 19 is a flowchart showing an example operation of the controller in the case of performing a modification process for the target point.

FIG. 19 is a flowchart showing an example operation of the controller 180 in the case of performing the aforementioned modification process for the target point P. Except that step S331, S332, S341 and S342 are added, the flowchart shown in FIG. 19 is identical to the flowchart show in FIG. 15.

In the example of FIG. 19, if it is determined at step S306 that the row of trees has not been gone out of, control proceeds to step S331. At step S331, based on the obstacle map, the controller 180 determines whether any other row of trees exists that obstructs turning. If no other row of trees exists that obstructs turning, control returns to step S306. If another row of trees exists that obstructs turning, control proceeds to step S332. At step S332, the controller 180 modifies the target point. The method of determination at step S331 and the method of modifying the target point at step S332 are as described with reference to FIG. 17A and FIG. 18A. By adding the processes of step S331 and S332, it becomes possible to modify the y coordinate value of the target point before turning as necessary.

In the example of FIG. 19, after transitioning to the turning travel mode at step S308, control proceeds to step S341. At step S341, the controller 180 determines whether any other row of trees exists that obstructs turning or not, based on the obstacle map. If no other row of trees exists that obstructs turning, control proceeds to step S309. If another row of trees exists that obstructs turning, control proceeds to step S342. At step S342, the controller 180 modifies the target point. The method of determination at step S341 and the method of modifying the target point at step S342 are as described with reference to FIG. 17B and FIG. 18B. With the modification of the position of the target point, the controller 180 also modifies the turning path. By adding the processes of steps S341 and S342, it becomes possible to modify the y coordinate value of the target point during turning as necessary, and prevent the work vehicle 100 or the implement 300 from coming into contact with another row of trees.

Thus, before a turn or during the turning travel, if the end of another row of trees besides the two rows of trees that are located on opposite sides of the work vehicle 100 is detected based on the sensor data, the controller 180 may modify the position of the target point P in accordance with a position relationship between the end of this other row of trees and the target point P. For example, if the end of the other row of trees is detected based on the sensor data during turning travel, and if the x coordinate value of the end of the other row of trees is smaller than the x coordinate value of the target point and the y coordinate value of the end of the other row of trees is greater than the y coordinate value of the target point in the turning coordinate system Σt, the controller 180 may update the y coordinate value of the target point to a value that is equal to or greater than the y coordinate value of the end of the other row of trees.

Although the above example illustrates that the target point P is modified, without modifying the target point P, the turning path 46 may be modified to avoid contact with another row of trees. For example, after setting the turning path, if any other row of trees besides the two adjacent rows of trees is detected based on the sensor data, the controller 180 may modify the turning path in accordance with a position relationship of the other row of trees and the turning path.

Figure 20:
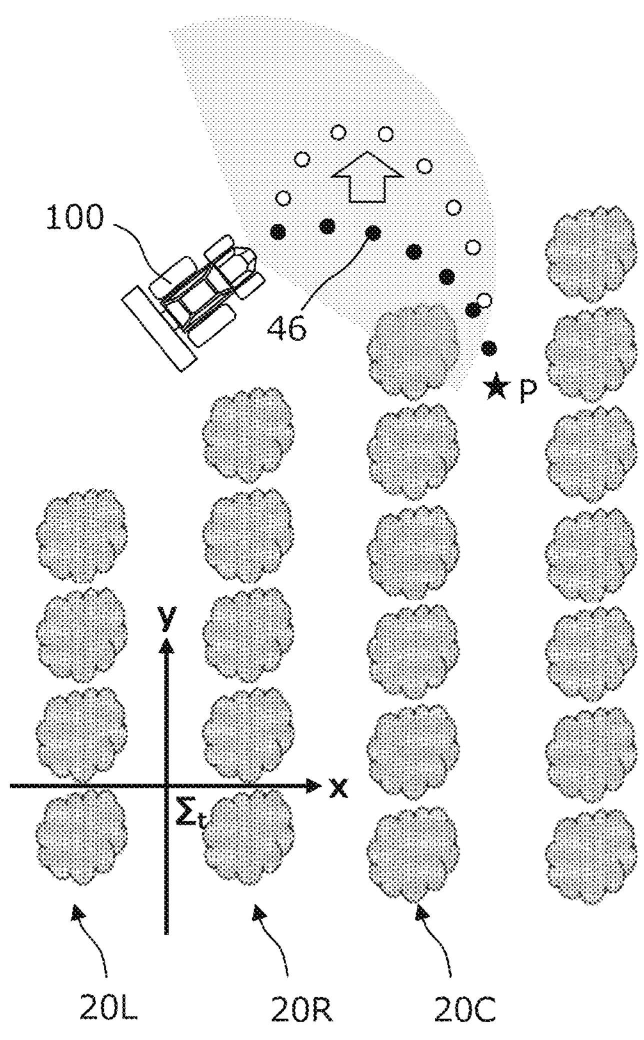
FIG. 20 is a diagram showing an example where a turning path is modified while maintaining the target point.

FIG. 20 is a diagram showing an example where the turning path 46 is modified while maintaining the target point P. In this example, upon detecting another row of trees 20C on or near the turning path 46 during a turn based on the sensor data, the controller 180 modifies the turning path 46, without modifying the target point P. Depending on the position relationship between the other row of trees 20C and the target point P, without having to modify the target point P, a mere modification of the turning path 46 can prevent contact between the work vehicle 100 and the other row of trees 20C. In that case, it would be effective to apply the operation shown in FIG. 20.

Without being limited to the above method, other methods may be adopted as the method of setting a target point for the turning travel. For example, in a case where the height of the crop rows is so low that the surrounding environment of a travel path after turning can be sensed by using the LiDAR sensor(s) 140, an environment map may be generated based on the sensor data and a target point may be set based on the environment map. Hereinafter, an example of such an operation will be described.

Figure 21:
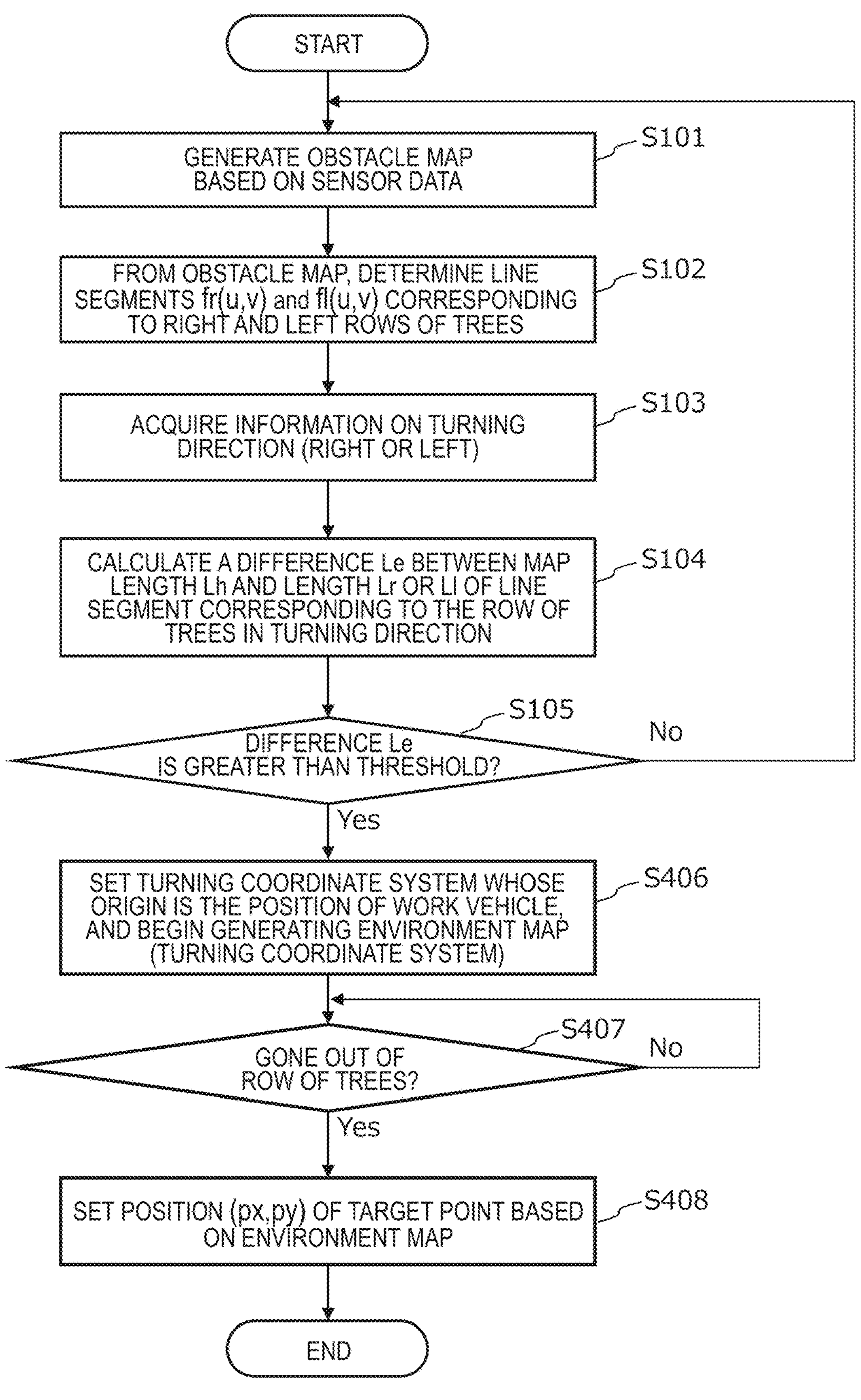
FIG. 21 is a flowchart showing an example of a method of setting a target point based on an environment map.

FIG. 21 is a flowchart showing an example of a method of setting a target point based on the environment map. In the flowchart shown in FIG. 21, steps S106 and S107 in the flowchart shown in FIG. 11 have been replaced by steps S406, S407 and S408. The operation from steps S101 to S105 is identical to the operation of the corresponding steps in FIG. 11.

In the example of FIG. 21, if it is determined at step S105 that a difference Le between the length Lh of the obstacle map and the length Lr or Ll of the line segment corresponding to the row of trees in the turning direction is greater than a threshold, control proceeds to step S406. At step S406, the controller 180 sets a turning coordinate system whose origin is the position of the work vehicle 100, and begins generating an environment map. The environment map may be a point cloud map or an occupancy grid map that is expressed in the turning coordinate system. The environment map may be generated through a process of joining together the consecutively-generated sensor data (or obstacle maps) after subjecting them to a coordinate transform. Algorithms such as SLAM may be used for the generation of the environment map.

At the next step S407, the controller 180 determines whether the work vehicle 100 has gone past the end of the row of trees in the turning direction. This determination process is identical to the process at step S306 shown in FIG. 15. Until it is determined that the work vehicle 100 has gone past the end of the row of trees in the turning direction, the work vehicle 100 continues generating the environment map based on the sensor data, while traveling between rows of trees. If it is determined that the work vehicle 100 has gone past the end of the row of trees in the turning direction, control proceeds to step S408.

At step S408, the controller 180 sets the position (px,py) of the target point based on the environment map expressed in the turning coordinate system. For example, the controller 180 can set the x coordinate value px of the target point based on information as to the pre-designated turning direction and how many rows ahead the turn should be made (n) and the interval between rows of trees as estimated from the environment map. Furthermore, based on the distribution of row of trees indicated by the environment map, the controller 180 can set the y coordinate value py of the target point. For example, the y coordinate value py of the target point may be set to a value that is equal to or greater than the y coordinate value of the leading end of a row of trees that is located on the side of the work vehicle 100 and is the closest to the travel path, as viewed from the travel path in the next instance of inter-row travel.

After step S408, the controller 180 sets a turning path from the position of the work vehicle 100 at that moment toward the position (px,py) of the target point, and causes the work vehicle 100 to travel along the turning path. For example, while performing localization through a matching between the sensor data and the environment map, the controller 180 performs steering control so as to minimize the deviation between the position and orientation of the work vehicle 100 and the turning path. As a result, the work vehicle 100 can be made to turn toward the target point.

In the above example embodiments, the one or more exterior sensors included in the work vehicle are a LiDAR sensor(s) to output two-dimensional or three-dimensional point cloud data as sensor data through scanning of a laser beam. However, the exterior sensors are not limited to such LiDAR sensors. For example, other types of sensors such as flash-type LiDAR sensors or image sensors may be used. Such other types of sensors may be used in combination with scan-type LiDAR sensors.

Although in the above example embodiments the work vehicle performs self-traveling between rows of trees in an orchard, the work vehicle may be used for the purposes of self-traveling between crop rows other than rows of trees. For example, the techniques according to the present disclosure are applicable to a work vehicle, such as a tractor, that performs self-traveling among a plurality of crop rows in an agricultural field.

A device that performs the processing needed for the self-traveling of the work vehicle according to the above example embodiment may be mounted to a work vehicle lacking such functionality as an add-on. For example, a controller configured or programmed to control the operation of a work vehicle that travels among a plurality of crop rows may be attached to the work vehicle in use.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A work vehicle to perform self-traveling among a plurality of crop rows, the work vehicle comprising:

an exterior sensor configured to output sensor data indicating a distribution of geographic features around the work vehicle; and a controller including one or more processors configured or programmed to control self-traveling of the work vehicle; wherein the one or more processors are configured or programmed to:

detect two crop rows existing on opposite sides of the work vehicle based on the sensor data;

cause the work vehicle to travel along a path between the two crop rows;

while the work vehicle is traveling between the two crop rows, consecutively generate an obstacle map having a predetermined length and width based on the sensor data;

based on the obstacle map, estimate a length, in the obstacle map, of a crop row corresponding to a turning direction between the two crop rows;

based on a difference between a predetermined length of the obstacle map and the estimated length of the crop row corresponding to the turning direction, detect an end of the crop row corresponding to the turning direction;

upon detecting the end of the crop row corresponding to the turning direction:

determine an origin of a coordinate system for turning travel of the work vehicle based on a position of the work vehicle at a time when the end of the crop row corresponding to the turning direction is detected;

set the coordinate system for turning travel, the coordinate system being fixed to a ground surface;

set a target point for the turning travel based on an interval between the two crop rows and the detected end of the crop row corresponding to the turning direction; and set a turning path toward the target point based on the coordinate system and the target point; and control the turning travel of the work vehicle along the turning path toward the target point based on the coordinate system.

2. The work vehicle of claim 1, wherein the one or more processors are configured or programmed to, when the difference between the predetermined length of the obstacle map and the estimated length of the crop row corresponding to the turning direction in the obstacle map exceeds a threshold, determine that the end of the crop row corresponding to the turning direction has been detected.

3. The work vehicle of claim 1, wherein the coordinate system is defined by a y axis that extends from the origin in a traveling direction of the work vehicle traveling between the two crop rows and by an x axis that extends in a direction that is parallel to the horizontal plane and perpendicular to the y axis; and the one or more processors are configured or programmed to estimate an interval between the two crop rows based on the sensor data, and set an integer multiple of the interval as an x coordinate value of the target point.

4. The work vehicle of claim 1, wherein the coordinate system is defined by a y axis that extends from the origin in a traveling direction of the work vehicle traveling in between the two crop rows and by an x axis that extends in a direction that is parallel to the horizontal plane and perpendicular to the y axis; and the one or more processors are configured or programmed to set a y coordinate value of the end of the crop row in the coordinate system as a y coordinate value of the target point.

5. The work vehicle of claim 3, wherein the one or more processors are configured or programmed to set a y coordinate value of the end of the crop row in the coordinate system as a y coordinate value of the target point.

6. The work vehicle of claim 1, wherein the one or more processors are configured or programmed to, after determining the target point, upon detecting an end of another crop row based on the sensor data, modify the target point in accordance with a positional relationship between the end of the other crop row and the target point.

7. The work vehicle of claim 6, wherein the one or more processors are configured or programmed to, after determining the target point, upon detecting an end of another crop row based on the sensor data, update the y coordinate value of the target point to the y coordinate value of the end of the other crop row when an x coordinate value of the end of the other crop row is smaller than an x coordinate value of the target point and a y coordinate value of the end of the other crop row is greater than a y coordinate value of the target point in the coordinate system.

8. The work vehicle of claim 1, wherein the one or more processors are configured or programmed to:

operate in an inter-row travel mode to cause the work vehicle to travel along a path between the two crop rows and in a turning travel mode to cause the work vehicle to turn in a headland;

in the inter-row travel mode, based on the sensor data being consecutively output from the exterior sensor, cause the work vehicle to travel along the path while setting the path in between two crop rows by detecting the two crop rows; and in the turning travel mode, set a turning path on the coordinate system, and cause the work vehicle to travel along the turning path while estimating its own position in the coordinate system based on the sensor data being consecutively output from the exterior sensor.

9. The work vehicle of claim 8, wherein the one or more processors are configured or programmed to, after setting the coordinate system and the target point in the inter-row travel mode, switch to the turning travel mode.

10. The work vehicle of claim 9, wherein the one or more processors are configured or programmed to, after setting the coordinate system and the target point in the inter-row travel mode, determine whether turning is possible based on the sensor data, and when it is determined that turning is possible, switch to the turning travel mode.

11. The work vehicle of claim 9, wherein the one or more processors are configured or programmed to, after setting the coordinate system and the target point in the inter-row travel mode, upon determining, based on the sensor data, that a space needed for the turning travel exists and that the work vehicle has passed the end of the crop row, switch to the turning travel mode.

12. The work vehicle of claim 8, wherein the one or more processors are configured or programmed to, after setting the target point, upon detecting another crop row based on the sensor data, modify the turning path based on a positional relationship between the other crop row and the turning path.

13. The work vehicle of claim 1, wherein the exterior sensor includes one or more LiDAR sensors configured to output point cloud data as the sensor data.

14. A control method for a work vehicle to perform self-traveling among a plurality of crop rows, the control method comprising:

detecting two crop rows existing on opposite sides of the work vehicle based on sensor data that is output from an exterior sensor mounted on the work vehicle;

causing the work vehicle to travel along a path between the two crop rows;

while the work vehicle is traveling between the two crop rows, consecutively generating an obstacle map having a predetermined length and width based on the sensor data;

based on the obstacle map, estimating a length, in the obstacle map, of a crop row corresponding to a turning direction between the two crop rows;

based on a difference between a predetermined length of the obstacle map and the estimated length of the crop row corresponding to the turning direction, detecting an end of the crop row corresponding to the turning direction;

upon detecting the end of the crop row corresponding to the turning direction:

determining an origin of a coordinate system for turning travel of the work vehicle based on a position of the work vehicle at a time when the end of the crop row corresponding to the turning direction is detected;

setting the coordinate system for turning travel, the coordinate system being fixed to a ground surface;

setting a target point for the turning travel based on an interval between the two crop rows and the detected end of the crop row corresponding to the turning direction; and setting a turning path toward the target point based on the coordinate system and the target point; and controlling the turning travel of the work vehicle along the turning path toward the target point based on the coordinate system.

* * * * *